United States Patent [19]

Ryoke et al.

[11] Patent Number: 5,089,331

[45] Date of Patent: Feb. 18, 1992

[54] MAGNETIC RECORDING MEDIUM

[75] Inventors: Katsumi Ryoke; Masatoshi Takahashi; Tsugio Izaki; Masaki Suzuki, all of Kanagawa, Japan

[73] Assignee: Fuji Photo Film Co., Ltd., Kanagawa, Japan

[21] Appl. No.: 421,434

[22] Filed: Oct. 13, 1989

[30] Foreign Application Priority Data

| Oct. 14, 1988 | [JP] | Japan | 63-257282 |
| Oct. 14, 1988 | [JP] | Japan | 63-257283 |
| Oct. 17, 1988 | [JP] | Japan | 63-259405 |

[51] Int. Cl.$^5$ ............................................. G11B 23/00
[52] U.S. Cl. .................................... 428/323; 428/329; 428/408; 428/694; 428/900
[58] Field of Search ............... 428/323, 329, 408, 694, 428/900

[56] References Cited

U.S. PATENT DOCUMENTS

| 4,582,757 | 4/1986 | Miyoshi et al. | 428/694 |
| 4,654,258 | 3/1987 | Kawamata et al. | 428/694 |
| 4,734,325 | 3/1988 | Ryoke et al. | 428/694 |
| 4,801,505 | 1/1989 | Ejiri et al. | 428/694 |
| 4,803,121 | 2/1989 | Ryoke et al. | 428/694 |
| 4,820,581 | 4/1989 | Saito et al. | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium composed of a non-magnetic support having thereon at least one magnetic layer containing a ferromagnetic fine powder dispersed in a binder, wherein (a) the magnetic layer further contains at least one of (i) carbon black having a sodium content of at most 100 ppm, (ii) carbon black having a chlorine content of less than 400 ppm, and (iii) an abrasive having a Mohn' hardness of at least 8 and a mean particle size of 0.05 to 0.5 μm and a sodium content of at most 100 ppm; (b) the ferromagnetic fine powder is a magnetic metal powder having a sodium content of at most 200 ppm; and/or (c) the magnetic recording medium further has a back layer provided on the side of the non-magnetic support opposite to the magnetic layer, containing carbon black having a chlorine content of at most 300 ppm dispersed in a binder. The magnetic recording medium has superior storage stability, with remarkably limited dropout increase, head clogging, C S/N decrease and RF output decrease.

19 Claims, No Drawings

MAGNETIC RECORDING MEDIUM

FIELD OF THE INVENTION

This invention relates to improvement in storage stability characteristics of magnetic recording media comprising a non-magnetic support and a magnetic layer. More particularly, the invention relates to magnetic recording media in which the dropout increase, head clog, C S/N decrease and RF output decrease are satisfactorily suppressed or reduced.

BACKGROUND OF THE INVENTION

Magnetic recording media, inclusive of disks and memory tapes, used for recording audio, video, computer or other information generally consist of a non-magnetic base support, a magnetic coating layer disposed on one side of the support and containing ferromagnetic fine particles dispersed in a binder, and a back coat layer disposed on the other side of the support and containing a non-magnetic fine powder dispersed in a binder.

In recent years, these magnetic recording media have been required to provide high density recording. Signal-to-noise ratio elevation and noise reduction have been achieved by using finer ferromagnetic powders, using alloy powders, employing high loading factor values or finishing the magnetic recording medium surface to extreme smoothness, for instance. For achieving high density recording in a certain given time, it is necessary to increase the rate of writing or transfer of information into magnetic recording media and, therefore, high magnetic recording medium speeds are required. For attaining such high travel speeds, it is essential that the magnetic recording media should be good in running, antistatic and head cleaning properties. For this purpose, fillers such as carbon black and abrasives having a Mohs hardness of not less than 8 are used in the magnetic layer, as disclosed, for example, in JP-A-59-193533, JP-A-59-186125, JP-A-59-191133, JP-A-58-189831 and JP-A-59-63029 (the term "JP-A" as used herein means an "unexamined published Japanese patent application"). Furthermore, carbon black is used in the back coat layer to improve running and durability, as disclosed in JP-A-52-96505, JP-A-55-28507, JP-B-54-21248 and JP-B-52-17401 (the term "JP-B" as used herein means an "examined Japanese patent publication").

Furthermore, whether these magnetic recording media can store magnetic records stably over scores of years is another important problem. Approaches to solving the storage stability problem for magnetic recording media may be summarized as follows. First, changes in magnetic characteristics of ferromagnetic fine powders during storage should be suppressed or inhibited. Thus, deterioration of magnetic characteristics due to oxidation in alloy powders or due to changes in distribution of Co or $Fe^{++}$ in particles of Co-containing $\gamma$-$Fe_2O_3$ should be prevented. Second, deterioration of binders should be prevented. It is known that binder coat layers are generally subject to deterioration due to ultraviolet radiation, temperature and/or humidity, as disclosed in E. F. Cuddhy, *IEEE Trans. Mag.*, Mag. 16, 4, 558 (July 1980). Vinyl chloride-vinyl acetate copolymer resins and cellulosic resins are known to be less subject to such deterioration than polyurethane resins and are used in an amount of about 10 to 60% by weight on the whole binder basis. Third, foreign matter formation in magnetic recording media, which may cause dropouts or induce head gap clogging leading to spacing losses, thereby hindering regeneration of magnetic records, should be prevented. A variety of causes have been known for such foreign matter formation and have been eliminated, including, for example, certain fatty acids, certain fatty acid esters, oligomers in macromolecular supports, and certain inorganic salts.

As for the inorganic salt formation, it is known that the metal ion content or counter anion content of ferromagnetic fine powders in the magnetic layer should be reduced (cf. JP-B-40-11733, JP-B-48-27118, JP-A-56-51029 and JP-A-56-101649) or that the Na content of carbon black in the back coat layer should be suppressed (cf. Japanese Patent Application No. 63-97380). It is also known that the content of water-soluble salts coming from ferromagnetic metal-forming metals (e.g., Fe, Co, Ni) and/or other additive metals (e.g., Cr, Mn, Zn) should be suppressed (cf. JP-A-56-51029). It is known that ferromagnetic fine powders have a Ca content of about 100 ppm (parts per million) and that carbon black has an Na content of 170 to 500 ppm. Furthermore, ferromagnetic metal fine powders are known to have a water-soluble Fe content of 80 to 2,900 ppm.

Even by the efforts mentioned above, however, it has been very difficult to prevent dropout and head clogging due to formation of inorganic salts. This is considered to be due to the difficulty in specifying the sources of such inorganic salts.

SUMMARY OF THE INVENTION

Accordingly, it is an object of the present invention to provide a magnetic recording medium having good storage stability.

It is a further object of the invention to provide a magnetic recording medium with remarkably limited dropout increase, head clogging, C S/N decrease and RF output decrease.

It has now been found that the above objects can be accomplished by a magnetic recording medium having a magnetic layer containing at least a ferromagnetic fine powder and a binder as disposed on a non-magnetic support, characterized in that it satisfies at least one of the following conditions (a) to (c):

(a) the magnetic layer further comprises at least one of (i) carbon black having a sodium content of at most 100 ppm, (ii) carbon black having a chlorine content of less than 400 ppm, and (iii) an abrasive having a Mohs' hardness of at least 8 and a mean particle size of 0.05 to 0.5 $\mu$m and a sodium content of at most 100 ppm;

(b) the ferromagnetic fine powder comprises a magnetic metal powder having a sodium content of at most 200 ppm; and (c) the magnetic recording medium further comprises a back layer provided on the side of the non-magnetic support opposite to the magnetic layer, containing carbon black having a chlorine content of at most 300 ppm dispersed in a binder

DETAILED DESCRIPTION OF THE INVENTION

The present inventors have markedly improved the storage stability characteristics of magnetic recording media by identifying the previously unknown sources of inorganic salts and clarifying the relationship between inorganic salts and storage stability characteristics.

Thus such problems as dropouts, head clogging, C S/N decrease and RF output decrease have been overcome in the present invention by further reducing the very low content of water-soluble Na remaining in carbon black, abrasives, other powders (fillers) and ferromagnetic powders (in particular, magnetic metal powders) contained in the magnetic layer and back coat layer of magnetic recording media, and/or by further reducing the very low content of water-soluble Cl remaining in carbon black.

The terms "Na content" and "Cl content" as used herein are relative to the respective water-soluble components. Such Na content and Cl content are determined in the following manner. A specified quantity (5 g) of each sample is weighed and suspended in 100 ml of deionized water, and the suspension is shaken or heated under reflux and then filtered or decanted to give a sample solution, which is subjected to atomic absorption analysis or plasma ion spectro-photometry, for instance, followed by calculation with reference to calibration curves constructed by using standard samples. X-ray fluorescence analysis is also applicable.

In the magnetic recording medium according to the invention, the formation and crystal growth of NaCl occurring in the process of magnetic recording medium manufacture, for example, in the steps of mixing, dispersing and application of magnetic coating mixes, or during long-term storage of the magnetic recording medium are prevented or suppressed as a result of the reduction of at least one of the water-soluble Na content and water-soluble Cl content of magnetic layer-constituting powders, such as carbon black, abrasives and magnetic metal powders, and of carbon black used in the back coat layer.

For instance, when carbon black having a mean particle size of 20 mµ as used in the magnetic layer and back coat layer has an Na content of 300 ppm or a Cl content of 600 ppm, NaCl crystals of 50 to 5,000 mµ in size are formed on the magnetic layer and back coat layer of magnetic recording media manufactured by using such carbon black. When formed on the magnetic layer, NaCl crystals as large as 5,000 mµ immediately cause dropouts. Even when formed on the back coat layer, such large crystals are transferred from the back coat layer to the magnetic layer on the occasion of the magnetic layer coming into contact with the back coat layer during winding or rewinding, causing dropouts in the same manner as above. Furthermore, even small NaCl crystals, 50 mµ in size, once formed on the magnetic layer and/or back layer, grow with time as a result of repeated dissolution and recrystallization by the action of atmospheric moisture, eventually causing dropouts either as they are on the magnetic layer or after migration from the back coat layer to the magnetic layer.

In addition, NaCl crystals of 50 mµ in size, either immediately when formed on the magnetic layer or after migration to the magnetic layer when formed on the back coat layer, take up binder components and/or carbon black from the magnetic recording medium when the medium runs under friction on a VTR (video tape recorder), for instance, to form adhering substance grains having a size of 100 mµ or more. These adhering grains cause dropouts and/or head clogging.

In accordance with the invention, such NaCl formation is prevented by reducing at least one of the water-soluble Na content and Cl content of carbon black, abrasives and magnetic metal powders used in the magnetic layer of magnetic recording media and/or of carbon black contained in the back coat layer. While NaCl formation is the principal cause of dropouts and head clogging, other alkali metals than Na (e.g. K etc.) and alkaline earth metals (e.g. Ca etc.) can react with halogen atoms occurring in magnetic coating mixes or in magnetic recording media to form inorganic salts and should preferably be removed to afford K and Ca contents as low as possible.

When the Na content is reduced to a trace level according to the invention, the addition as a lubricant of a fatty acid to the magnetic layer is effective and preferable. Thus, the fatty acid can react with Na remaining in trace amounts in magnetic coating mixes or magnetic recording media to convert the Na to the corresponding fatty acid sodium salt, whereby the appearance of NaCl can be inhibited.

Since the water-soluble Na and/or Cl content is low enough to allow dissolution in organic solvents, the extent of dissolution of Na and/or Cl in the magnetic recording medium manufacturing process can be estimated based on the water-soluble Na and/or Cl content value, as defined in "Kagaku Binran (Manual of Chemistry)", 2nd edition, Basic Section II, page 809. The formation of NaCl during storage of magnetic recording media can be estimated based on the water-soluble Na content value.

Preferred embodiments of the magnetic recording medium of the invention include the following magnetic recording media (1) to (4):

(1) a magnetic recording medium having a non-magnetic support having a magnetic layer containing a ferromagnetic fine powder, a binder, carbon black and an abrasive disposed thereon by coating, where the carbon black has a sodium content of not more than 100 ppm;

(2) a magnetic recording medium having a non-magnetic support having a magnetic layer containing a ferromagnetic fine powder, a binder, carbon black and an abrasive disposed thereon by coating, where the abrasive is a powder having a Mohs' hardness of not less than 8, a mean particle size of 0.05 to 0.5 µm and a sodium content of not more than 100 ppm;

(3) a magnetic recording medium having a non-magnetic support having a magnetic layer containing a ferromagnetic fine powder, a binder, carbon black and an abrasive disposed thereon by coating, where the carbon black has a chlorine content of less than 400 ppm; and (4) a magnetic recording medium having a non-magnetic support having a magnetic layer containing a magnetic metal powder, and a binder disposed thereon by coating, where the magnetic metal powder has a sodium content of not more than 200 ppm.

The above magnetic recording media (1) to (4) are now described in further detail.

The magnetic recording media (1) to (3) according to the invention have as a basic structure a non-magnetic support having a magnetic layer containing a ferromagnetic fine powder, a binder, carbon black and an abrasive disposed thereon by coating.

In the magnetic recording media (1) to (4), the magnetic layer may further contain a lubricant, and/or have another magnetic layer or a back layer containing a non-magnetic powder (e.g., carbon black) and a binder disposed on the side opposite to the magnetic layer.

The magnetic recording medium (1) according to the invention is first described.

When the content of sodium (Na) in carbon black is reduced to a level not exceeding 100 ppm, preferably not exceeding 70 ppm, more preferably not exceeding 10 ppm, the formation of salts (e.g. NaCl) due to the reaction of sodium with halogen atoms contained in carbon black and/or in a powder or powders other than the carbon black can be markedly reduced.

When, furthermore, the contents of potassium (K) and calcium (Ca) in carbon black are reduced each to a level not exceeding 100 ppm, preferably not exceeding 50 ppm, the formation of salts (e.g. KCl, CaCl$_2$) due to the reaction of K and/or Ca with halogen atoms contained in carbon black and/or in a powder or powders other than the carbon black can preferably be reduced markedly at the same time.

When the content of each of Na, K and Ca exceeds 100 ppm, in particular 300 ppm, the salt formation becomes excessive, unfavorably causing dropouts, head clogging, and a decease in RF output.

Carbon black species of various types can be used in the magnetic layer without particular limitation, provided that the Na content thereof is 100 ppm or below. Thus, carbon blacks such as furnace rubber black, thermal rubber black, color black and acetylene black can be used in the practice of the invention. Specific examples, when expressed in terms of abbreviations used in the United States, include, among others, SAF, ISAF, IISAF, T, HAF, SPF, FF, FEF, HMF, GPF, APF, SRF, MPF, ECF, SCF, CF, FT, MT, HCC, HCF, MCF, LFF and RCF, and those classified and listed in ASTM D 1765-82a can be used. These carbon blacks useful in the practice of the invention have a specific mean particle size of 5 to 1,000 millimicrons (as determined by electron microscopy), a specific surface area (as determined by the nitrogen adsorption method) of 1 to 1,500 m$^2$/g, a pH of 3 to 11 (as determined by the method of JIS K 6221-1982), an oil (dibutyl phthalate, DBP) absorption of 5 to 2,000 ml/100 g (as determined by the method of JIS K 6221-1982}, an iodine adsorption of 1 to 1,000 mg/g (as determined by the method of JIS K 6221-1982) and an ash content of not more than 0.2% by weight (as measured by the method of JIS K 6221-1982). These carbon blacks useful in the practice of the invention have a water content of 0.00 to 20% by weight. For lowering the surface electrical resistance of the carbon black-containing coat layer, they should preferably have a mean particle size of 5 to 100 millimicrons and, for controlling the coat layer strength, a mean particle size of 50 to 1,000 millimicrons. For controlling the coat layer surface roughness for smoothing so that the spacing loss can be reduced, relatively fine carbon black species (not more than 100 millimicrons) should be used while, for reducing the friction coefficient by surface roughening, relatively coarse carbon black species (not less than 50 millimicrons) should be used. In this way, the kind and amount of carbon black are varied depending on the requirements to be met by the magnetic recording medium in question.

The carbon blacks mentioned above may be used after surface treatment, for example, with the dispersant described below or after grafting a resin thereon. Partially surface-graphitized carbon blacks obtained by treatment at a furnace temperature of not less than 2,000° C. in the process of carbon black manufacture may also be used. As a special grade of carbon black, hollow carbon black may be used as well.

When used in the magnetic layer, these carbon blacks are used in an amount of 0.5 to 10 parts by weight per 100 parts by weight of the ferromagnetic fine powder. Carbon blacks useful in the practice of the invention and their physical characteristics can be found, for example, in Carbon Black Manual edited by the Japan Carbon Black Association (published 1971).

In the conventional processes, carbon black is generally manufactured by feeding a feedstock to a high temperature reactor furnace for decomposition and carbon black formation. The reaction product is quenched with water, ground and dried. The water used for quenching is industrial water which contains inorganic salts (Na salts, Ca salts, etc.) in trace amounts. Industrial water also contains chlorine or one or more biocidal chlorine compounds for preventing algae, bacteria and other microorganisms from growing. Such inorganic salts, chlorine and chlorine compounds are adsorbed on carbon black and remain concentrated in carbon black without being removed in the subsequent processing steps. Therefore, conventional grades of carbon black contain 170 to 500 ppm or more of Na and 450 to 2,000 ppm or more of Cl.

The carbon blacks used in the magnetic layer of the magnetic recording medium (1) according to the invention which have an Na content as low as 100 ppm or less can be prepared, for example, by using water having very low inorganic salt content for quenching in carbon black manufacture or by washing conventional carbon blacks with pure water (deionized water or distilled water) with heating.

The latter preparation method is generally carried out in the following manner. Thus, carbon black is placed in a vessel, and deionized or distilled water is added to the vessel. Carbon black is washed by stirring the mixture. If necessary, washing is repeated for desalting carbon black. After removal of water, carbon black is dried to give the desired grade of carbon black. More specifically, in a test run, 10 g of carbon black with an Na content of 300 ppm is weighed and 100 ml of distilled water is added. After 3 hours of stirring at 50° C., the mixture is filtered and carbon black is dried at 105° C. for 24 hours. The Na content of carbon black prepared in this manner was 10 ppm as determined on an atomic absorption spectrophotometer. The same procedure can reduce the levels of other ions (e.g. K, Ca, etc.) as well.

Other physical characteristics of the carbon black having a reduced Na content obtained by washing with water in the above manner (i.e. carbon black washed with water) were, for example, as follows: pH 7.7 (JIS K 6221-1982), dibutyl phthalate (DBP) absorption 150 ml/100 g (JIS K 6221-1982), iodine absorption 170 mg/g (JIS K 6221-1982), ash content 0.1% by weight (JIS K 6221-1982) and toluene tinting strength- 99.8%.

The magnetic recording medium (2) according to the invention is now described in greater detail.

When the Na content of the abrasive is reduced to a level not exceeding 100 ppm, preferably not exceeding 70 ppm, more preferably not exceeding 10 ppm, the salt formation resulting from reaction with halogen atoms contained in the abrasive and/or a powder or powders other than the abrasive can be markedly reduced.

Furthermore, when the K and Ca contents of the abrasive are each not more than 100 ppm, preferably not more than 50 ppm, the formation of salts resulting from reaction with halogen atoms contained in the abrasive and/or a powder or powders other than the abrasive can be markedly reduced.

In addition, the Cl content of the abrasive should preferably be not more than 300 ppm, preferably not more than 150 ppm, more preferably not more than 75 ppm. The salt formation resulting from reaction of Cl with alkali metals and alkaline earth metals contained in the abrasive and/or a powder or powders other than the abrasive can be markedly reduced when the Cl content of the abrasive is at a level not exceeding 300 ppm.

Various abrasive powders having a Mohs' hardness of not less than 8, a mean particle size of 0.05 to 0.5 μm and preferably 0.1 to 0.3 μm, and an Na content of not more than 100 ppm may be used in the magnetic layer without any particular limitation.

Thus, in the practice of the invention, materials generally used as abrasives, particularly ones having a Mohs' hardness of not less than 8, are used in the magnetic layer, including o-alumina, Y-alumina, α, γ-alumina, fused alumina, silicon carbide, chromium oxide, cerium oxide, corundum, artificial diamond, α-iron oxide, garnet, emery (main components: corundum and magnetite), silica, silicon nitride, boron nitride, molybdenum carbide, boron carbide, tungsten carbide, titanium carbide, quartz and the like. These materials may be used either alone or in the form of a mixture of two to four of them. These abrasives are added in an amount within the range of 0.01 to 20 parts by weight per 100 parts by weight of the binder.

Particularly preferred powders for use as abrasives are α-$Al_2O_3$, $Cr_2O_3$ and SiC.

The Na content of the abrasive powder can be reduced, for example, by washing the powder with pure water (deionized water or distilled water) with heating or boiling. More specifically, the procedure mentioned above for reducing the Na content of carbon black with reference to the magnetic recording medium (1) can be applied without any particular modification. The Na content of the abrasive can be determined by atomic absorption analysis or X-ray fluorescence analysis.

In the magnetic recording media (1) and (2) according to the invention, it is preferred that the magnetic layer contains a fatty acid containing 9 to 40 carbon atoms as a lubricant. Addition of such fatty acids to the magnetic layer provides magnetic recording media having good storage characteristics, namely suppressed increase of dropouts, head clogging and RF output reduction. Particularly suitable are such fatty acids as oleic acid, lauric acid, caprylic acid, myristic acid, palmitic acid and stearic acid. These fatty acids are used in an amount within the range of 0.005 to 20 parts by weight per 100 parts by weight of the binder. These fatty acids react with alkali metal atoms and alkaline earth metal atoms to form fatty acid metal salts, whereby the formation of inorganic salts is prevented. These fatty acids are effective only in systems such as magnetic recording media (1) and (2), in which the Na content of carbon black and/or a powder such as an abrasive is reduced. They are quite ineffective in systems where the Na content is not reduced.

The magnetic recording medium (3) according to the invention is now described in greater detail.

Reduction of the Cl content of carbon black to less than 400 ppm, preferably to a level not exceeding 300 ppm, more preferably not exceeding 150 ppm, most preferably not exceeding 75 ppm, can lead to marked reduction of the salt formation resulting from reaction of Cl with alkali metal and alkaline earth metal atoms contained in carbon black and/or a powder or powders other than carbon black.

Various types or grades of carbon black can be used as the carbon black in the magnetic layer of the magnetic recording medium (3) without any particular limitation, provided that they have a Cl content of less than 400 ppm, as mentioned above. It is preferred, however, that the mean particle size of carbon black is 5 to 100 millimicrons (as determined by electron microscopy). Specific examples of carbon black include those mentioned above for magnetic recording medium (1) with the exception of the above-mentioned mean particle size.

While, as mentioned above, conventional carbon blacks contain 450 to 2000 ppm or more of Cl, those carbon blacks which have a Cl content of less than 400 ppm, as mentioned above, can be prepared, for example, by using a desalted heavy oil as the raw material for carbon black manufacture or by using water having a low Cl content as quenching water in carbon black manufacture or by washing conventional carbon blacks with pure water (deionized water or distilled water) with heating or boiling.

For washing carbon black with pure water with heating or boiling, the same procedure as mentioned above for inorganic Na salt removal from carbon black with reference to the magnetic recording medium (1) can be applied. More specifically, in a model run, 10 g of carbon black with a Cl content of 600 ppm is weighed and 100 ml of distilled water is added. After stirring the mixture at 50° C. for 3 hours, the mixture is filtered and carbon black is dried at 105° C. for 24 hours. The Cl content of a carbon black sample prepared in the above manner was 50 ppm as determined by X-ray fluorescence analysis.

The Cl content of carbon black also can be determined by atomic absorption analysis.

In the magnetic recording medium (3) according to the invention, it is preferred that the magnetic layer contains a fatty acid containing 2 to 40 carbon atoms, preferably 6 to 22 carbon atoms, as a lubricant. Magnetic recording media having good storage characteristics, namely suppressed increase of dropout, with head clogging and RF output reduction being well prevented, can be obtained by adding such fatty acids to the magnetic layer. Particularly suited are such fatty acids as oleic acid, lauric acid, caprylic acid, myristic acid, palmitic acid and stearic acid. These fatty acids are added in an amount of 0.005 to 20 parts by weight per 100 parts by weight of the binder. These fatty acids react with alkali metal and alkaline earth metal atoms to form fatty acid metal salts, whereby the formation of inorganic salts is prevented. These fatty acids are effective only in such systems as the magnetic recording medium (3) in which the Cl content of carbon black is reduced. They are quite ineffective in systems in which the Cl content is not reduced or controlled.

The magnetic recording medium (4) according to the invention is now described in greater detail.

When the Na content of the magnetic metal powder is not more than 200 ppm, preferably not more than 100 ppm, the salt formation resulting from reaction of Na with halogen atoms contained in the magnetic metal powder and/or a powder or powders other than the magnetic metal powder can be reduced markedly.

When, additionally, the K and Ca contents of the magnetic metal powder are each not more than 200 ppm, preferably not more than 100 ppm, the salt formation resulting from reaction of K and Ca with halogen atoms contained in the magnetic metal powder and/or a powder or powders other than the magnetic metal powder can preferably be reduced further.

When the Na, K and/or Ca content of the magnetic metal powder exceeds the level of 200 ppm, particularly 300 ppm, salt formation becomes significant and results in dropouts, head clogging and RF output reduction.

Various magnetic metal powders having an Na content of 200 ppm or less, as mentioned above, may be used without any particular limitation.

In the present invention, it is preferred that a ferromagnetic alloy powder containing iron, cobalt and/or nickel and having a specific surface area of not less than 35 m$^2$/g is used as the magnetic metal powder.

Examples of such ferromagnetic alloy powder, include alloy powders having a metal content of not less than 75% by weight, with at least one ferromagnetic metal or alloy (e.g. Fe, Co, Ni, Fe-Co, Fe-Ni, Co-Ni, Co-Ni-Fe) accounting for not less than 80% by weight of the metal content and other components (e.g. Al, Si, S, Sc, Ti, V, Cr, Mn, Cu, Zn, Y, Mo, Rh, Pb, Ag, Sn, Sb, Te, Ba, Ta, W, Re, Au, Hg, Pb, Bi, La, Ce, Pr, Nd, B, P) optionally accounting for not more than 20% by weight of the metal content. Iron nitride is a further example. The above-mentioned ferromagnetic metal powders may contain water, hydroxides and/or oxides each in a small amount. Methods are well known in the art for the production of these ferromagnetic metal powders. The ferromagnetic alloy powders, which are typical of the magnetic metal powders used in the practice of the invention, can be produced by any known methods.

Thus, the following methods may be used for the production of ferromagnetic alloy powders:

(a) the method of reducing composite organic acid salts (mainly oxalates) with a reducing gas such as hydrogen;

(b) the method of reducing iron oxides with a reducing gas such as hydrogen to give Fe or Fe-Co particles;

(c) the method of subjecting metal carbonyl compounds to pyrolysis;

(d) the method of reducing ferromagnetic metals in aqueous solution with a reducing agent such as sodium borohydride, a hypophosphite or hydrazine;

(e) the method of using a mercury cathode for electrolytic deposition of ferromagnetic metal powders, followed by separation from mercury; and (f) the method of evaporating metals in a low-pressure inert gas atmosphere to give fine metal powders.

The ferromagnetic alloy powders may have any shape without particular limitation. Generally, acicular, equant, cubic, rice grain-like, and tabular forms are used. The ferromagnetic alloy powders preferably have a specific surface areas ($S_{BET}$) of not less than 40 m$^2$/g, more preferably not less than 45 m$^2$/g.

The Na content of the magnetic metal powders used for the manufacture of the magnetic recording medium (4) according to the invention can be reduced to a level not exceeding 200 ppm by (i) strictly avoiding the use of sodium hydroxide in excess in carrying out the reaction of ferrous sulfate with sodium hydroxide so that the contamination with Na can be reduced and (ii) washing, with heating or boiling, the oxide or hydroxide obtained by the above reaction with pure water (deionized water or distilled water).

For example, JP-A-56-51029 discloses that the contents of water-soluble salts of metals forming ferromagnetic metals (e.g. Fe, Co, Ni) and of other additive metal (e.g. Cr, Mn, Zn) can be reduced to 2,000 ppm or less, preferably 500 ppm or less by washing the ferromagnetic metal powders with an aqueous solvent or further treating in an aqueous solution containing a surfactant. In the examples, ferromagnetic metal powders with a reduced water-soluble Fe content of 80 to 260 ppm are described. It is also disclosed that it is important to remove soluble impurities (e.g. Cl$^-$, Na$^+$, K$^+$, etc.).

However, the Na content cannot be reduced to 200 ppm, even when ferromagnetic metal powders are washed by the method described in JP-A-56-51029. As is evident from Comparative Example 11 (cf. Table 7) below, an Na content exceeding 200 ppm readily produces adverse effects such as dropouts, head clogging and RF output decrease.

In the magnetic recording medium (4) according to the invention, this problem has been solved.

The ferromagnetic metal fine powders used in the invention are produced generally in the following manner. Thus, acicular goethite $\alpha$-FeOOH) is produced by reaction of ferrous sulfate (FeSO$_4$.7H$_2$O) with sodium hydroxide (NaOH). Reduction of this goethite with H$_2$ gas at 350° C. gives acicular magnetite (Fe$_3$O$_4$), which when oxidized with O$_2$ gas at 350° C., is converted to acicular maghemite ($\gamma$-Fe$_2$O$_3$). Reduction of such goethite or maghemite with H$_2$ gas at 400° C. gives a ferromagnetic metal fine powder.

The method of washing as described in JP-A-56-51029, is washing ferromagnetic metal fine powders obtained by reduction with H$_2$ gas with an aqueous solvent in an N$_2$ gas atmosphere at a temperature not exceeding 200° C.

The washing with pure water (deionized water or distilled water) according to the invention is washing goethite or maghemite before reduction to ferromagnetic metal fine powders with H$_2$.

Furthermore, in the present invention the contamination with Na is reduced by strictly controlling the amount of sodium hydroxide so that no excess sodium hydroxide can be used in the reaction of ferrous sulfate with sodium hydroxide. Although the rate of crystal growth can be increased by using sodium hydroxide in excess, this method cannot reduce the content of contaminant Na.

The Na content of the magnetic metal powders can be determined by the atomic absorption method or X-ray fluorescence method, described above.

While each of magnetic recording media (1) to (4) according to the invention have been described separately, combinations of two or more of these embodiments are more preferred embodiments of the present invention.

For example, it is preferred to use a grade of carbon black which has an Na content of not more than 100 ppm, which is characteristic of magnetic recording medium (1), with an abrasive having an Na content of not more than 100 ppm, which is characteristic of the magnetic recording medium (2); to use a grade of carbon black which meets both requirements of the magnetic recording media (1) and (3), namely carbon black having an Na content of not more than 100 ppm and a Cl content of less than 400 ppm; and various other combinations.

In magnetic recording media (1) to (3) according to the invention, known ferromagnetic fine powders can be used in the magnetic layer without any particular limitation. Thus, for example, iron oxide type ferromagnetic powders, ferromagnetic metal or alloy powders, ferrite type ferromagnetic powders, CrO$_2$ and iron nitride may be used.

These ferromagnetic fine powders are composed of particles having a length of about 0.005 to 1 micron, with an axis length-to-axis width ratio of about 1/1 to 50/1, and have a specific surface area of about 1 to 70 m²/g. These ferromagnetic fine powders may be immersed in a solvent containing, a dispersant, a lubricant, an antistatic agent and other additives described below prior to dispersion so that such additives can be adsorbed thereon.

Specific examples of the ferromagnetic iron oxide fine powders include $\gamma$-$Fe_2O_3$, Co-containing (Co-coated, Co-modified or Co-doped) $\gamma$-$Fe_2O_3$, $Fe_3O_4$, Co-containing (coated, modified or doped) $Fe_3O_4$, $\gamma$-$FeO_x$ and Co-containing (coated, modified or doped) $\gamma$-$FeO_x$ (x=1.33 to 1.50).

Examples of the ferromagnetic ferrite powders are modified barium ferrite and modified strontium ferrite. Tabular hexagonal barium ferrite can be used as well. Particles of the barium ferrite have a diameter of about 0.001 to 1 micron, a thickness of $\frac{1}{2}$ to 1/20 of the diameter, a specific gravity of 4 to 6 g/cc and a specific surface area of 1 to 70 m²/g.

Useful ferromagnetic metal or alloy powders include those mentioned above for use in the magnetic recording medium (4). In particular, preferred ferromagnetic alloy powders contain iron, cobalt and/or nickel and have a specific surface area of not less than 35 m²/g. Typical examples are Co-Ni-P alloys, Co-Ni-Fe-B alloys, Fe-Ni-Zn alloys, Ni-Co alloys and Co-Ni-Fe alloys. The ferromagnetic metals may contain water, hydroxides and/or oxides each in a small amount.

For use in the magnetic recording media (1) to (3) according to the invention, the iron oxide type ferromagnetic powders should preferably have an Na content of not more than 100 ppm, more preferably not more than 70 ppm, most preferably not more than 10 ppm. It is also preferably that they have a K content and a Ca content each not exceeding 100 ppm, more preferably not exceeding 50 ppm.

Furthermore, for use in the magnetic recording media (1) to (3) according to the invention, the ferromagnetic metal or alloy powders should preferably have an Na content not exceeding 200 ppm, more preferably not exceeding 100 ppm, as mentioned above with reference to the magnetic recording medium (4). It is also preferred that they have a K content and a Ca content each not exceeding 200 ppm, more preferably not exceeding 100 ppm, most preferably not exceeding 50 ppm.

For use in the magnetic recording media (1) to (4) according to the invention, the ferromagnetic fine powders should preferably have a Cl content of not more than 300 ppm, more preferably not more than 200 ppm. Reduction of the Cl content of the ferromagnetic fine powders to the above-mentioned levels results in marked reduction of the formation of salts (e.g. NaCl, KCl, $CaCl_2$) which may otherwise result from reaction of Cl with alkali metal atoms and/or alkaline earth metal atoms contained in the ferromagnetic fine powders and/or a powder or powders other than the ferromagnetic fine powders.

The Cl content of the ferromagnetic fine powders can be reduced to a level not exceeding 300 ppm and the contents of Na, Ca and K each to a level not exceeding 100 ppm by, for example, (i) strictly avoiding the excessive use of sodium hydroxide or potassium hydroxide in performing the reaction of ferrous sulfate ($FeSO_4$) with sodium hydroxide or potassium hydroxide so that the contamination with Na or K can be reduced, (ii) washing, with heating or boiling, the oxide or hydroxide obtained by the above reaction with deionized water or distilled water and (iii) using $CoSO_4$, for instance, for Co coating, while avoiding the use of $CoCl_2$.

In manufacturing the magnetic recording media (1) to (4) according to the invention, ingredients and/or additives generally used in magnetic recording media may be used in addition to the above-mentioned carbon black, abrasives, fatty acids and. ferromagnetic fine powders (or magnetic metal powders).

A binder is generally used in the magnetic layer and the optional back coat layer of the magnetic recording media according to the invention. Suitable binders include, but are not limited to, conventional thermoplastic resins, thermosetting resins, reactive resins, and mixtures of these.

The thermoplastic resins should have a softening point not higher than 150° C., a mean molecular weight of 10,000 to 300,000 and a degree of polymerization of about 50 to 2,000 and include, among others, vinyl chloride-vinyl acetate copolymers, vinyl chloride polymers, vinyl chloride-vinylidene chloride copolymers, vinyl chloride-acrylonitrile copolymers, acrylate ester-acrylonitrile copolymers, acrylate ester-vinylidene chloride copolymers, acrylate ester-styrene copolymers, methacrylate ester-acrylonitrile copolymers, methacrylate ester-vinylidene chloride copolymers, methacrylate ester-styrene copolymers, urethane elastomers, nylon-silicone resins, nitrocellulose-polyamide resins, polyvinyl fluoride, vinylidene chloride-acrylonitrile copolymer, butadiene-acrylonitrile copolymer, polyamide resins, polyvinyl butyral, cellulose derivatives (e.g. cellulose acetate butyrate, cellulose diacetate, cellulose triacetate, cellulose propionate, nitrocellulose, ethylcellulose, methylcellulose, propylcellulose, methylethylcellulose, carboxymethyl-cellulose, and acetylcellulose), styrene-butadiene copolymers, polyester resins, chlorovinyl ether-acrylate ester copolymers, amino resins and various synthetic rubbers, and mixtures of these.

The thermosetting resins or reactive resins, when they are in coating compositions, have a molecular weight not more than 200,000. Upon application, drying and subsequent heating of such compositions, they undergo condensation, addition and/or similar reactions and acquire an infinitely great molecular weight. Among such resins those which will not soften or melt until they are thermally decomposed are preferred. Specific examples are phenol resins, phenoxy resins, epoxy resins, curable polyurethane resins, urea resins, melamine resins, alkyd resins, silicone resins, reactive acrylic resins, epoxy-polyamide resins, nitrocellulose-melamine resins, high-molecular-weight polyester resin-isocyanate prepolymer mixtures, methacrylate salt copolymer-diisocyanate prepolymer mixtures, polyester polyol-polyisocyanate mixtures, urea-formaldehyde resin, low-molecular-weight glycol-high-molecular-weight diol-triphenylmethanetriisocyanate mixtures, polyamine resins, polyimine resins, and mixtures of these.

These binders are used either singly or in combination, together with an additive or additives. In magnetic layer formation, the binders are used in an amount of 5 to 300 parts by weight per 100 parts by weight of the ferromagnetic fine powders. In back coat layer formation, the binders are used in an amount within the range of 30 to 300 parts by weight per 100 parts by weight of the fine powders. The additives include dispersants, lubricants, abrasives, antistatic agents, antioxidants, and solvents.

These thermoplastic resins, thermosetting resins and reactive resins preferably contain, in addition to the respective main functional groups, one or more, generally one to six, other functional groups selected from acidic groups, (such as carboxylic acid, sulfinic acid, sulfenic acid, sulfonic acid, phosphoric acid, sulfuric acid, phosphone, phosphine, boric acid, sulfate ester and phosphate ester groups (which may be esterified with an alkyl group)); amphoteric groups (such as those derived from amino acids, amino sulfonic acids, sulfate or phosphate esters of amino alcohols and alkylbetaines); amino, imino, imido, amido, epoxy; and hydroxyl, alkoxyl, thiol, halogen, silyl and siloxane groups. The content of each functional group is preferably within the range of $1 \times 10^6$ to $1 \times 10^{-2}$ equivalents per gram of resin.

In a further preferred embodiment of the invention, the Na content of the binders is reduced to a level not exceeding 100 ppm. The sodium content of the binders comes from catalysts used in binder resin manufacture or the counter cation for acidic functional groups in the above-mentioned resins. Since ferromagnetic iron oxides, magnetic metal powders and the like ferromagnetic finer powders are basic substances, acidic functional groups are introduced into the resins for improving the bonding between these basic substances and the resins. The introduction of acidic functional groups itself is favorable for the improvement of bonding and of the dispersibility of magnetic powders. However, while the introduction of a carboxyl group (—COOH), for instance, as an acidic functional group is preferable, the introduction of this group in the form having Na as a counter cation (i.e. a carboxylic acid Na salt: —COONa) is disadvantageous since it results in an increase in the Na content of the resins.

In the present invention, it is preferred to use a halogen-containing binder (particularly, a chloride resin, such as vinyl chloride resin, vinyl chloride-vinyl acetate copolymer resin or vinylidene chloride-acrylonitrile copolymer resin) as a binder component in the magnetic layer of the magnetic recording medium (1), (2) or (4) according to the invention. While a hydrogen halide (particularly hydrogen chloride) is released from the halide type resin binder used as a result of aging, the control of the Na content at a very low level can prevent the formation of NaCl which is a cause of dropouts and head clogging. Halide type resin binders (in particular chloride resins) have good dispersing properties and good durability and, in systems in which these desirable binders are used, too, the NaCl formation can be prevented, as mentioned above, in the magnetic recording media (1), (2) and (4) according to the invention.

In the practice of the invention, carbon black may be used in the back coat layer which is optionally provided. The carbon black used in the back coat layer is not limited to any particular type or grade. It is preferred, however, to use those grades of carbon black which have a reduced Na or Cl content or a reduced Na content and a reduced Cl content, such as those mentioned above with reference to the magnetic recording medium (1) or (3). In the back coat layer, the weight ratio of carbon black and binder is within a range such that the binder amounts to 30 to 200 parts by weight per 100 parts by weight of carbon black.

In an, additional embodiment, the present invention includes a magnetic recording medium which has a non-magnetic support, a magnetic layer disposed on one side of the support containing at least a ferromagnetic fine powder and a binder, and a back coat layer disposed on the opposite side of the support containing at least carbon black and a binder, where the carbon black has a Cl content of not more than 300 ppm.

In this embodiment, the carbon black to be used in the back coat layer may be any of those types and grades mentioned above for magnetic recording media (1) and (3), provided that it has a Cl content of not more than 300 ppm.

A preferred binder used in the back coat layer is a halogen-free resin. The term "halogen-free" resin as used herein includes resins having no covalently bonded halogen atoms (e.g. chlorine) in their molecular structure, namely resins other than halogen-containing resins (e.g. vinyl chloride resin and vinyl chloride copolymer resins such as vinyl chloride-vinyl acetate copolymer resin). Halogen-containing resins are very unfavorable for durability (or resistance to aging), since halogen atoms may be released from the molecular structure of halogen-containing binder resins depending on conditions such as temperature, humidity, ultraviolet radiation, and basicity of said resins. In the case of halogen-containing resins, the halogen atoms released react with hydrogen, for instance, to give a hydrogen halide (hydrogen chloride when the halogen atoms are chloride atoms), which in turn leads to formation and growth of inorganic salts when the back coat layer and/or magnetic layer contain metals such as Na.

The halogen-free resin in the back coat layer, includes halogen-free thermoplastic, thermosetting or reactive resins, and mixtures of these. Preferred examples are urethane resins, ester resins, phenoxy resins, epoxy resins, polyisocyanates, cellulose-derivative resins and urethane carbonate resins. Combined use of two or more of such halogen-free resins is particularly preferred since magnetic recording media having excellent storage stability characteristics, including suppressed dropout increase, head clogging and/or C S/N decrease, can be obtained through such combined use.

The halogen-free thermoplastic resins have a softening point of not higher than 150° C., a mean molecular weight of 10,000 to 300,000, and a degree of polymerization of about 50 to 2,000. The halogen-free thermosetting or reactive resins have a molecular weight of not more than 200,000 in coating compositions and, upon application, drying and heating, undergo such reactions as condensation and addition and acquire an infinitely great molecular weight. Preferred among these resins are those which will not soften or melt until they are thermally decomposed.

These halogen-free thermoplastic resins, thermosetting resins and reactive resins preferably contain, in addition to the respective main functional groups, one or more, generally one to six, other functional groups each selected from the class consisting of acidic groups (such as carboxylic acid, sulfinic acid, sulfonic acid, phosphoric acid, sulfuric acid, sulfate ester and phosphate ester groups (which may be esterified with an alkyl group)); amphoteric groups (such as ones derived from amino acids, amino sulfonic acids, sulfate or phosphate esters of amino alcohols and alkylbetaines); amino, imino, imido, amido; and hydroxyl, alkoxyl, thiol, silyl and siloxane groups. The content of each functional group is preferably within the range of $1 \times 10^{-6}$ to $1 \times 10^{-2}$ equivalents per gram of resin.

The carbon black/binder weight ratio in the back coat layer is desirably within the range of 100 parts by weight of carbon black to 30 to 200 parts by weight of binder.

In this magnetic recording medium according to the invention, it is preferred that the back coat layer contains, as a lubricant, a fatty acid containing 9 to 40 carbon atoms in the same manner as in the magnetic recording media (1) and (2) mentioned above, for such lubricant serves to improve the storage stability characteristics, suppressing dropout increase, head clogging and C S/N decrease. The fatty acid is used in an amount of 0.005 to 20 parts by weight per 100 parts by weight of binder.

Polyisocyanates may be used in forming the magnetic layer and back coat layer of the magnetic recording media according to the invention.

As polyisocyanates usable in the practice of the invention, there may be mentioned such isocyanates as tolylene diisocyanate, 4,4'-diphenylmethanediisocyanate, hexamethylene diisocyanate, xylylene diisocyanate, naphtylene-1,5-diisocyanate, o-toluidinediisocyanate, isophoronediisocyanate, triphenylmethanetriisocyanate and the like, reaction products of these isocyanates and polyalcohols, and dimeric to decameric polyisocyanates from condensation of isocyanates, among others. These polyisocyanates preferably have a mean molecular weight of 100 to 20,000. Some of these polyisocyanates are commercially available under the trademarks Coronate L, Coronate HL, Coronate 2030, Coronate 2031, Millionate MR, Millionate MTL (Nippon Polyurethane Industry), Takenate D-102, Takenate D-110N, Takenate D-200, Takenate D-202, Takenate 300S, Takenate 500 (Takeda Chemical Industries), Sumidur T-80, Sumidur 44S, Sumidur PF, Sumidur L, Sumidur N, Desmodur L, Dusmodur IL, Desmodur N, Desmodur HL, Desmodur T65, Desmodur 15, Desmodur R, Desmodur RF, Desmodur SL, and Desmodur Z4243 (Sumitomo-Bayer). These may be used singly or two or more of them may be used in combination, so that the differences in reactivity in curing among them can be advantageously utilized. For promoting curing reactions hydroxyl group-containing compounds (butanediol, hexane-diol), amino group-containing compounds (monoethylamine, dimethylamine, trimethylamine) and metal oxide catalysts may be used additionally. It is desirable that the hydroxyl- or amino-containing compounds are polyfunctional. The polyisocyanates are preferably used in an amount of 5 to 40% by weight based on the total binder weight in the magnetic layer.

In the practice of the invention, fatty acids containing 10 to 26 carbon atoms ($R_1COOH$ where $R_1$ is an aliphatic group containing 9 to 25 carbon atoms), such as caprylic acid, capric acid, behenic acid, elaidic acid, linolic acid, linolenic acid and stearolic acid, amides derived from such fatty acids, and lecithin are used as dispersants. Also usable are higher alcohols containing 4 or more carbon atoms (butanol, octyl alcohol, myristyl alcohol, stearyl alcohol) as well as sulfate esters, phosphate esters and amine compounds derived from such alcohols. Further useful are polyalkylene oxides, sulfate esters, phosphate esters or amine compounds derived therefrom, sulfosuccinic acid and esters thereof, and so forth. It is also possible to introduce Si- or F-containing substituents into these compounds for modifying their compatibility with the binders or the characteristics of the magnetic recording media. Generally, the dispersants are used either singly or in combination each in an amount of 0.005 to 20 parts by weight per 100 parts by weight of binders. The dispersants may be used for preliminary coating of the ferromagnetic fine powders or non-magnetic fine powders therewith or may be added in the step of dispersing.

Other compounds preferred as dispersants are such surfactants as carboxylic acids and phosphate esters, and fluorine-containing surfactants such as Fluorad FC95, FC129, FC430 and FC431.

The optional lubricant used in the magnetic layer and in the back coat layer includes inorganic fine powders, such as molybdenum disulfide, boron nitride, fluorinated graphite, calcium carbonate, barium sulfate, silicon oxide, titanium oxide, zinc oxide, tin oxide and tungsten disulfide; resins in fine powder form, such as acrylic-styrene resin fine powders, benzoguanamine resin fine powders, melamine resin fine powders, polyolefin resin fine powders, polyester resin fine powders, polyamide resin fine powders, polyimide resin fine powders and polyfluorinated ethylene resin fine powders; silicone oils; fatty acid-modified silicone oils; graphite; fluorinated alcohols; polyolefins (e.g., polyethylene wax); polyglycol (e.g., polyethylene oxide wax); tetrafluoroethylene oxide wax; polytetrafluoroglycol; perfluorofatty acids; perfluorofatty acid esters; perfluoroalkyl sulfate esters; perfluoroalkyl phosphate esters; alkylphosphoric acid esters; polyphenyl ether; fatty acid esters derived from a monobasic fatty acid containing 10 to 20 carbon atoms and one or more of monohydric, dihydric, trihydric, tetrahydric and hexahydric alcohols containing 3 to 12 carbon atoms; fatty acid esters containing 11 to 28 carbon atoms in total derived from a monobasic fatty acid containing 9 not less than 10 carbon atoms and a monohydric to hexahydric alcohol; and the like organic compound lubricants. Fatty acids containing 8 to 22 carbon atoms, and fatty acid amides and fatty alcohols derived therefrom can also be used. Specific examples of these organic compound lubricants are butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, anhydrosorbitanethylene oxide adduct monostearate, oleyl oleate, oleyl alcohol and lauryl alcohol. These may be used either singly or in combination. The lubricant oil additives may also be used either singly or in combination in the practice of the invention, including antioxidants (alkylphenols), rust inhibitors (naphthenic acid, alkenylsuccinic acid, dilauryl phosphate), oiliness improvers (rapeseed oil, lauryl alcohol), extreme pressure agents (dibenzyl disulfide, tricresyl phosphate, tributyl phosphite), detergent-dispersants, viscosity index improvers, pour point depressants and antiforms. The lubricants are used in an amount of 0.05 to 20 parts by weight per 100 parts by weight of binders.

Useful examples of the antioxidants are benzotriazines, benzothiazoles, benzodiazines, EDTA and the like heterocyclic or heteroacryclic compounds.

The antistatic agents include electroconductive powders, such as graphite, tin oxide-antimony oxide, tin oxide, titanium oxide-tin oxide-antimony oxide; natural surfactants, such as saponins; nonionic surfactants, such as alkylene oxide-based ones, glycerol-based one, glycidol-based ones, polyhydric alcohols, polyhydric alcohol esters, alkylphenol-EO (ethylene oxide) adducts; cationic surfactants, such as higher alkylamines, cyclic amines, hydantoin derivatives, amide amines, ester amides, quaternary ammonium salts, pyridines and other heterocycles, phosphonium or sulfonium compounds; anionic surfactants containing an acidic group such as a carboxylic, sulfonic, phosphoric, sulfate ester or phosphate ester group; amino acids; and amphoteric surfactants, such as aminosulfonic acids, amino alcohol-derived sulfate or phosphate esters, and alkylbetaines. These surfactants may be used either singly or in admixture. The surfactants are used in the magnetic recording media in an amount of 0.01 to 10 parts by weight per 100 parts by weight of ferromagnetic fine powder. The surfactants may be used to form a topcoat layer on the surface of the magnetic recording media in an amount of 1 to 550 mg/m$^2$. While they are used principally as antistatic agents, they may also serve other purposes., for example, dispersion, improvement of magnetic characteristics or improvement of lubricating properties, or as coating additives.

Organic solvents usable in dispersing, mixing and application in the practice of the invention include, among others, ketones, such as acetone, methyl ethyl ketone, methyl isobutyl ketone, cyclohexanone, tetrahydrofuran, and isophorone; alcohols, such as methanol, ethanol, propanol, butanol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, glycol dimethyl ether, glycol monoethyl ether, and dioxane: tar-derived solvents (aromatic hydrocarbons), such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, and hexane. They may be used in admixture in any appropriate mixing ratio.

The method of mixing is not particularly limited. The order of addition or charging of the respective ingredients can be established appropriately. For preparing magnetic coating mixes and back coating mixes, ordinary mixers, such as two-roll mills, three-roll mills, ball mills, pebble mills, trommels, sand grinders, Szegvari mixers, attritors, high-speed impeller dispersion mixers, high-speed stone mills, high-speed impact mills, Disper mills, kneaders, high-speed mixers, ribbon blenders, cokneaders, intensive mixers, tumblers, blenders, dispersers, homogenizers, single screw extruders, twin screw extruders and ultrasonic dispersers, may be used. The techniques of mixing and dispersing are described in detail, for example, in T. C.. Patton, *Paint Flow and Pigment Dispersion*, (John Wiley & Sons, 1964) and S. Tanaka, *Kogyo Zairyo (Industrial Materials)*, 25, 37 (1977), as well as in the publications cited in these publications. For continuous processing, the mixers are fed to an appropriate combination of the mixing means mentioned above, and described in U.S. Pat. Nos. 2,581,414 and 2,855,156. In the practice of the invention, magnetic coating mixes and back coating mixes can be prepared by performing mixing and blending as described in the above-cited publications or in the publications cited therein.

For magnetic layer formation, the above-mentioned ingredients are combined in an appropriate manner and dissolved or dispersed in an organic solvent system and the resulting coating fluid is applied to a support and then dried. For using the magnetic recording media in the form of tapes, the support preferably has a thickness of about 2.5 to 100 microns, preferably about 3 to 70 microns. In the case of disks or cards, the support has a thickness of about 0.03 to 10 mm and, in the case of drums, the support may be used in the form of a cylinder. Materials for the non-magnetic support include, for example, polyesters, such as polyethylene terephthalate, and polyethylene naphthalate; polyolefins, such as polypropylene, and polyethylene; cellulose derivatives, such as cellulose triacetate, and cellulose diacetate; vinyl resins, such as polyvinyl chloride, and polyvinylidene chloride; other plastics, such as polycarbonates, polyamides, and polysulfones; metals such as copper; and ceramics, such as glass. Supports made of these materials may be subjected, prior to coating, to corona discharge treatment, plasma treatment, primer coating, heat treatment, dust removing treatment, treatment for vapor phase metal deposition, and/or alkali treatment. Descriptions of these supports are found, for example, in German Patent No. 3,338,854A, JP-A-59-116926, U.S. Pat. No. 4,388,368 and S. Mitsuishi: *Seni to Kogyo (Textile and Industry)*, 31, 50–55 (1975).

The magnetic coating mixes and back coating mixes mentioned above can be applied to the supports by air doctor coating, blade coating, air knife coating, squeeze coating, dip coating, reverse roll coating, transfer roll coating, gravure coating, kiss roll coating, cast coating, spray coating or bar coating, or by any other appropriate method. Detailed descriptions of applicable methods can be found in *Coating Technology*, pages 253–277, (Asakura Shoten, Tokyo 1971).

The magnetic layer applied to and formed on a support in the above manner is immediately treated, as necessary, for orientation of the magnetic powder particles in the layer in a desired direction with drying, and the resulting magnetic layer is dried. The support feeding rate is generally within the range of 10 to 1,000 meters per minute and the drying temperature is controlled within the range of 20° C. to 130° C. The coated supports are subjected to treatment or surface smoothness or cutting to a desired dimension, as necessary, to give the magnetic recording media according to the invention. In the above production process, it is preferred to carry out the steps of filler surface treatment, mixing and dispersion, application, heat treatment, calendering, EB treatment, surface abrasion and cutting in a continuous manner. These steps may be divided into several groups as necessary.

In these steps, the temperature and humidity are controlled within the ranges of 10° C. to 130° C. and 5 to 20 mg of moisture per cubic meter of air, respectively. Suitable production conditions are disclosed, for example, in JP-B-40-23625, JP-B-39-28368 and U.S. Pat. No. 3,473,960. Furthermore, the method disclosed in JP-B-41-13181 is a fundamental and important technique in the relevant field of art.

The magnetic recording media according to the invention may have a bonding layer (primer layer, intermediate layer) between the magnetic layer and non-magnetic support, a lubricant layer (topcoat layer, protective layer) on the magnetic layer, a double-layer magnetic layer structure (as disclosed in JP-A-59-44037, JP-A-59-144039 to JP-A-59-144043, JP-A-53-21904, JP-A-53-21905 and JP-A-52-79905) or a triple-layer magnetic layer structure, a bonding layer (primer layer, intermediate layer) between the back coat layer and non-magnetic support, and/or a lubricant layer (topcoat layer, protective layer) on the back coat layer.

The invention is now described in further detail with reference to the following specific examples, but the present invention is not to be construed as being limited thereto. Unless otherwise indicated, all parts, percents and ratios are by weight.

Examples 1 to 4 relate to magnetic recording medium (1) according to the invention.

EXAMPLE 1

A magnetic coating mix was prepared by charging a kneader with the ingredients listed below under [I], kneading the charge to a sufficient extent, charging the kneader additionally with the ingredients listed below under [II], kneading the resulting mixture to a sufficient extent, adding, just prior to application, the ingredients listed below under [III] to the kneader and stirring the whole for attaining dispersion.

| Magnetic Coating Mix Composition | |
|---|---|
| [I] | |
| Co-containing $\gamma$-$Fe_2O_3$ powder (Na content 35 ppm; specific surface area (nitrogen adsorption method) 35 m²/g; powder Hc 680 Oe) | 300 parts |
| Vinyl chloride resin (Na content 100 ppm; containing $SO_3H$ and epoxy groups; MR110, product of Nippon Zeon) | 39 parts |
| Polyurethane resin (Nippolan N2304, product of Nippon Polyurethane Industry) | 10 parts |
| Carbon black (commercially available Conductex SC (Columbian Chemicals) washed with deionized water to Na content 10 ppm, mean particle size 20 m$\mu$) | 18 parts |
| Abrasive: $\alpha$-$Al_2O_3$ (product of Showa Light Metal; type A; Na content 15 ppm; mean particle size 0.6 $\mu$m) | 18 parts |
| Abrasive: $Cr_2O_3$ (product of Nippon Chemical Industrial; Na content 80 ppm; mean particle size 0.1 $\mu$m) | 3 parts |
| Oleic acid | 3 parts |
| Cyclohexanone | 150 parts |
| [II] | |
| Polyurethane resin (Nippolan N2304, product of Nippon Polyurethane Industry) | 10 parts |
| Butyl acetate | 850 parts |
| Octyl laurate | 3 parts |
| [III] | |
| Polyisocyanate (Desmodur L-75, product of Bayer) | 15 parts |
| Stearic acid | 3 parts |
| Butyl acetate | 100 parts |

After viscosity adjustment, this magnetic coating mix was applied to a non-magnetic polyethylene terephthalate support to a dry thickness of 4.0 $\mu$m and the wet coated support was subjected to orientation in a magnetic field consisting of a 3,000-gauss magnet, then dried and calendered. A magnetic layer was thus formed. Then, a back coating mix prepared by mixing the ingredients, specified below under [IV] in a ball mill, adding the ingredients shown below under [V] to the resultant dispersion and stirring the whole mixture was applied to the reverse side of the non-magnetic support carrying the magnetic layer, to a dry thickness of 1.5 $\mu$m to give a back coat layer.

| Back Coat Layer Composition | |
|---|---|
| [IV] | |
| Carbon black [Raven MTP; specific surface area (nitrogen adsorption method) 10 m²/g; mean particle size 250 m$\mu$; product of Cabot] | 100 parts |
| Polyurethane resin (Estane 5707, product of B.F. Goodrich) | 70 parts |
| Phenoxy resin (PKHH, product of Union Carbide) | 30 parts |
| Copper oleate | 0.1 part |
| Methyl ethyl ketone | 700 parts |
| Cyclohexanone | 300 parts |
| [V] | |
| Polyisocyanate (Coronate 2061, product of Nippon Polyurethane Industry) | 15 parts |
| Lubricant (Silicone KF69, product of Shin-Etsu Chemical) | 0.1 part |
| Lubricant (oleic acid) | 1 part |
| Methyl ethyl ketone | 100 parts |

The support was then slit to a width of 1 inch to give reels of video tape.

EXAMPLE 2

Video tape was manufactured in the same manner as in Example 1 except that Conductex SC, a commercial grade of carbon black, washed with deionized water to an Na content of 60 ppm was used as the carbon black in the magnetic layer composition.

EXAMPLE 3

Video tape was manufactured in the same manner as in Example 1 except that Conductex SC, a commercial grade of carbon black, washed with deionized water to an Na content of 100 ppm was used as the carbon black in the magnetic layer composition.

COMPARATIVE EXAMPLE 1

Video tape was manufactured in the same manner as in Example 1 except that Conductex SC, a commercial grade of carbon black which had an Na content of 250 ppm, was used as the carbon black in the magnetic layer composition.

COMPARATIVE EXAMPLE 2

Video tape was manufactured in the same manner as in Example 1 except that Conductex, a commercial grade of carbon black, which had an Na content of 900 ppm, was used as the carbon black in the magnetic layer composition.

The video tape samples obtained in the above examples were evaluated by the following methods.

Dropout (D.O.)

The video tape samples were subjected to dropout measurement (initial values) at room temperature (23° C., 50% RH (relative humidity)) using a Sony model BVH500 VTR (video tape recorder), then stored at 40° C. and 80% RH for a week and, after return to room temperature, subjected again to dropout measurement (values after storage) under the conditions mentioned above, and the differences between the dropout values (numbers) after storage and initial dropout values were calculated on a per-minute basis.

Head Clogging

The video tape samples were slit to ½ inch and the ½ inch video tape samples were stored at 40° C. and 80% RH for a week and, after return to room temperature, were examined for head clogging on a VHS type VTR under ambient conditions of 5° C. and 50% RH, with head clogging being monitored on a television screen. For each example, 10 reels were used each over a length corresponding to 60 minutes of playing and the number of reels which showed signs of head clogging, including temporary clogging (temporary clogging followed by recovery or restoration of output), was recorded.

The results thus obtained are shown in Table 1.

TABLE 1

| | Carbon Black | | Dropouts | Head |
| --- | --- | --- | --- | --- |
| | Na Content (ppm) | Cl Content (ppm) | (5 μsec, −16 dB) | Clogging (reels) |
| Example 1 | 10 | 20 | 5 | 0 |
| Example 2 | 60 | 150 | 6 | 0 |
| Example 3 | 100 | 250 | 6 | 0 |
| Comparative Example 1 | 250 | 600 | 32 | 5 |
| Comparative Example 2 | 900 | 2000 | 45 | 5 |

In Examples 1 to 3, carbon black was used after washing with deionized water. In Comparative Examples 1 and 2, different lots of commercial carbon black were selected and used without washing.

As is evident from the data shown in Table 1, the magnetic recording media according to the invention (Examples 1 to 3) showed excellent performance characteristics with respect to dropouts and head clogging. In Comparatives 1 and 2, cubic NaCl crystals 0.5 to 5 μm in size were observed on the coated layer under an electron microscope and, furthermore, NaCl was detected, together with the binder and other components, in the deposits found upon dropouts and upon head clogging. The effectiveness of the present invention was thus proved.

EXAMPLE 4

A magnetic coating mix was prepared by charging a kneader with the ingredients listed below under [I], kneading the charge to a sufficient extent, adding thereto the ingredients listed below under [II], kneading the resulting mixture to a sufficient extent, adding, just prior to application, the ingredients listed below under [III] to the kneader and stirring the whole to attain dispersion.

| Magnetic Coating Mix Composition | |
| --- | --- |
| [I] | |
| Ferromagnetic alloy powder | 300 parts |
| (Na content 50 ppm; specific surface area (nitrogen adsorption method) 45 m²/g; powder Hc 1,800 Oe) | |
| Vinyl chloride-vinyl acetate resin | 36 parts |
| (Na content below detection limit; COOH-containing; 400 × 110A, product of Nippon Zeon) | |
| Polyurethane resin | 10 parts |
| (Crisvon 7209, product of Dainippon Ink and Chemicals | |
| Carbon black | 18 parts |
| (commercial product Vulcan XC72 (product of Cabot) washed with deionized water to Na content 30 ppm, mean particle size 30 mμ) | |
| Abrasive: α-Al₂O₃ | 12 parts |
| (Hit 100, product of Sumitomo Chemical; Na content below detection limit; mean particle size 0.1 μm) | |
| Oleic acid | 3 parts |
| Cyclohexanone | 150 parts |
| [II] | |
| Polyurethane resin | 26 parts |
| (Nippolan N2304, product of Nippon POlyurethane Industry) | |
| Methyl ethyl ketone | 550 parts |
| Octyl myristate | 3 parts |
| [III] | |
| Polyisocyanate | 24 parts |
| (Coronate L, product of Bayer) | |
| Stearic acid | 3 parts |
| Methyl ethyl ketone | 100 parts |

After viscosity adjustment, this magnetic coating mix was applied to a non-magnetic polyethylene terephthalate support to a dry coating thickness of 3.0 μm, and the wet coated support was guided through a magnetic field consisting of a 3,000-gauss magnet for orientation, then dried, calendered and slit to a ½ inch width to give reels of video tape for a VHS system.

COMPARATIVE EXAMPLE 3

Video tape was manufactured in the same manner as in Example 4 except that the carbon black used in the magnetic layer composition had an Na content of 200 ppm.

The video tapes obtained in Example 4 and Comparative Example 3 were evaluated for their performance characteristics, i.e. dropouts and head clogging.

Dropout (D.O.)

The procedure mentioned above was followed using a modified VHS VTR.

Head Clogging

The procedure mentioned above was followed using a modified VHS VTR.

The results obtained are shown in Table 2.

TABLE 2

| | Carbon Black | | Dropouts | Head |
| --- | --- | --- | --- | --- |
| | Na Content (ppm) | Cl Content (ppm) | (5 μsec, −16 dB) | Clogging (reels) |
| Example 4 | 30 | 60 | 33 | 0 |
| Comparative Example 3 | 200 | 450 | 121 | 5 |

As is evident from the data shown in Table 2, the magnetic recording medium according to the invention showed superior performance characteristics with respect to dropouts and head clogging. In the case of Comparatives Example 3, it is apparent that the high Na content, as a common factor, had adverse effects.

An example of the magnetic recording medium (2) is shown in Example 5.

EXAMPLE 5

A magnetic coating mix was prepared by charging a kneader with the ingredients listed below under [I], kneading the charge to a sufficient extent, then adding the ingredients listed under [II], kneading the mixture to a sufficient extent, further adding, just prior to application, the ingredients listed under [III] and kneading the resulting mixture to a sufficient extent.

| Magnetic Coating Mix Composition | |
|---|---|
| [I] | |
| Co-containing γ-Fe₂O₃ powder (Na content 35 ppm; specific surface area (nitrogen adsorption method) 35 m²/g; powder Hc 680 Oe) | 300 parts |
| Vinyl chloride resin (Na content 100 ppm; containing SO₃H and epoxy groups; MR110, product of Nippon Zeon) | 39 parts |
| Polyurethane resin (Nippolan N2304, product of Nippon Polyurethane Industry) | 10 parts |
| Carbon black (Conductex SC (Columbian Chemicals) washed with deionized water; Na content 100 ppm, mean particle size 20 mμ) | 18 parts |
| Abrasive: α-Al₂O₃ (product of Showa Light Metal; type A; Na content 15 ppm; mean particle size 0.6 μm) | 18 parts |
| Abrasive: Cr₂O₃ (product of Nippon Chemical Industrial; Na content 80 ppm; mean particle size 0.1 μm) | 3 parts |
| Oleic acid | 3 parts |
| Cyclohexanone | 150 parts |
| [II] | |
| Polyurethane resin (Nippolan N2304, product of Nippon POlyurethane Industry) | 10 parts |
| Butyl acetate | 850 parts |
| Octyl laurate | 3 parts |
| [III] | |
| Polyisocyanate (Desmodur L-75, product of Bayer) | 15 parts |
| Stearic acid | 3 parts |
| Butyl acetate | 100 parts |

After viscosity adjustment, this magnetic coating mix was applied to a nonmagnetic polyethylene terephthalate support to a dry coating thickness of 4.0 μm and the wet coated support was guided through a magnetic field of a 3,000-gauss magnet for orientation, then dried and calendered. The non-magnetic support now having a magnetic layer was provided, on the reverse side thereof, with a back coat layer having a dry thickness of 1.5 μm in the same manner as in Example 1.

COMPARATIVE EXAMPLE 4

Video tape was manufactured in the same manner as in Example 5 except that type B α-Al₂O₃ (product of Showa Light Metal) having an Na content of 300 ppm was used in the magnetic layer composition instead of the abrasive α-Al₂O₃ (type A).

The video tapes obtained in Example 5 and Comparative Example 4 were evaluated for dropouts and head clogging in the same manner as in Example 1.

The results obtained are shown in Table 3.

TABLE 3

| | Abrasive (α-Al₂O₃) | | Dropouts | Head |
|---|---|---|---|---|
| | Na Content (ppm) | Cl Content (ppm) | (5 μsec, −16 dB) | Clogging (reels) |
| Example 5 | 15 | 30 | 6 | 0 |
| Comparative Example 4 | 300 | 500 | 30 | 4 |

The abrasives used in Example 5 and Comparative Example 4 were selected from among commercially available abrasives.

As is evident from the data shown in Table 3, the magnetic recording medium according to the invention showed good performance characteristics with respect to dropouts and head clogging. In Comparatives Example 4, cubic NaCl crystals, 0.5 to 5 μm in size, were observed on the coated layer under an electron microscope and the presence of NaCl, together with the binder and other ingredients, was confirmed in the deposits collected on the occasion of dropouts and of head clogging. The efficacy of the present invention was thus established.

Examples of the magnetic recording medium (3) according to the invention are described below in Examples 6 to 18.

EXAMPLE 6

A ball mill was charged with a portion of the composition specified below. After milling to a sufficient extent, the remaining portion was added to the ball mill. The resulting mixture was milled to a sufficient extent, 15 parts of Desmodur L-75 (polyisocyanate compound; product of Bayer) was added, and the whole mixture was milled for attaining homogeneous dispersion. A magnetic coating mix was thus prepared.

| Magnetic Coating Mix Composition | |
|---|---|
| Co-containing γ-Fe₂O₃ powder (Na content 30 ppm; Ca content 20 ppm; specific surface area (nitrogen adsorption method) 35 m²/g; powder Hc 650 Oe) | 300 parts |
| Vinyl chloride resin (containing SO₃H and epoxy groups; MR110, product of Nippon Zeon) | 25 parts |
| Crystalline polyurethane resin (C7209, product of Dainippon Ink and Chemicals) | 30 parts |
| Carbon black (washed with deionized water to Cl content 250 ppm; mean particle size 17 mμ) | 12 parts |
| Lecitin | 1 part |
| Oleic acid | 3 parts |
| Octyl laurate | 3 parts |
| Lauric acid | 2 parts |
| Butyl acetate | 330 parts |
| Methyl ethyl ketone | 660 parts |

After viscosity adjustment, this magnetic coating mix was applied to a polyethylene terephthalate base support to a dry coating thickness of 5 μ. The wet coated support was subjected to orientation, drying and calendering. A magnetic layer was thus formed.

A back coating mix was prepared by milling, in a ball mill, a mixture of the ingredients listed below and then adding 5 parts of Coronate 2061 (polyisocyanate; product of Nippon Polyurethane industry), followed by further milling for homogeneous dispersion. After viscosity adjustment, this coating mix was applied to the polyethylene terephthalate support on the side reverse to the magnetic layer to a thickness of 1.5 μm, followed by drying.

| Back Coating Composition | |
|---|---|
| Carbon black (Raven MTP; mean particle size 250 mμ) | 100 parts |
| Nippolan 2304 (product of Nippon Polyurethane Industry) | 30 parts |
| Phenoxy resin (PKHH, product of Union Carbide) | 20 parts |
| α-Alumina (Hit 100, product of Sumitomo Chemical) | 0.8 part |
| Silicone | 0.1 part |
| Copper oleate | 0.5 part |
| Stearic acid | 0.1 part |
| Methyl ethyl ketone | 600 parts |
| Cyclohexanone | 400 parts |

The tape obtained was calendered to a mirror finish and then slit to a 1 inch width to give sample reels.

The carbon black used in the magnetic layer composition shown above was prepared by washing Conductex SC (commercial product of Columbian Chemicals) with deionized water to a Cl content of 250 ppm. This water-washed carbon black had an Na content of 60 ppm and a Ca content of 60 ppm.

EXAMPLE 7

Sample reels were produced in the same manner as in Example 6 except that carbon black having a Cl content of 150 ppm was used as the carbon black in the magnetic layer composition.

The carbon black having a Cl content of 150 ppm was prepared by washing Conductex SC (commercial product of Columbian Chemicals) with an aqueous 0.04 weight % NaOH solution for removing Cl from the carbon black in the form of NaCl, then thoroughly washing with deionized water and drying. This water-washed carbon black had an Na content of 60 ppm and a Ca content of 60 ppm.

COMPARATIVE EXAMPLE 5

Samples were prepared in the same manner as in Example 6 except that Conductex SC (commercial product of Columbian Chemicals) having a Cl content of 1,000 ppm was used as the carbon black in the magnetic layer composition. This commercial carbon black had an Na content of 300 ppm and a Ca content of 250 ppm.

COMPARATIVE EXAMPLE 6

Samples were prepared in the same manner as in Example 6 except that another lot of Conductex SC (commercial product of Columbian Chemicals) which had a Cl content of 3,000 ppm was used as the carbon black in the magnetic layer composition. This commercial carbon black had an Na content of 900 ppm and a Ca content of 700 ppm.

The samples obtained in the above manner were evaluated for their performance characteristics by the following methods.

Dropouts (D.O.)

Each sample video tape having a length corresponding to 60 minutes of playing was played repeatedly on a Sony model BVH500 VTR and, after 5 passes, the frequency of dropouts per minute (5 μsec, −16 dB) was determined.

Head Clogging

Each sample video tape after signal recording was stored at 60° C. and 80% RH for 3 days and, after return to room temperature, was played back on a type VHS VTR while video head clogging was monitored on a television screen. For each example, 10 reels were examined each over a tape length corresponding to a play-time of 60 minutes. The result was reported in terms of the number of reels which showed head clogging, including temporary head clogging (temporary clogging followed by output recovery).

The results obtained are shown in Table 4.

TABLE 4

| | Carbon Black | | Dropouts | Head |
|---|---|---|---|---|
| | Cl Content (ppm) | Na Content (ppm) | (5 μsec, −16 dB) | Clogging (reels) |
| Example 6 | 250 | 60 | 30 | 0 |
| Example 7 | ≦150 | 60 | 30 | 0 |
| Comparative Example 5 | 1000 | 300 | 500 | 5 |
| Comparative Example 6 | 3000 | 900 | 700 | 8 |

As is evident from the data shown in Table 4, the magnetic recording media according to the invention showed good performance characteristics with respect to dropouts and head clogging. In Comparative Examples 5 and 6, it is apparent that the high Cl contents, as a common factor, produced adverse effects.

EXAMPLES 8 TO 18

A magnetic coating mix having the composition shown below was prepared and applied to a nonmagnetic polyethylene terephthalate support 10 μm thick to a dry coating thickness of 3.0 μm.

| Magnetic Coating Mix Composition | |
|---|---|
| Ferromagnetic alloy powder [Fe—Ni alloy: Ni content ca 5% by weight; specific surface area (S-BET) 45 m²/g] | 100 parts |
| Vinyl chloride/vinyl acetate/ maleic anhydride copolymer (400 × 110A, product of Nippon Zeon) | 12 parts |
| Urethane resin (UR8600, product of Toyobo) | 12 parts |
| Cr₂O₃ (mean particle size 0.2 μm) | 3 parts |
| Polyisocyanate (Coronate HL, product of Nippon Polyurethane Industry) | 8 parts |
| Carbon black (mean particle size 40 mμ; Cl content and Na content as shown in Table 5) | 6 parts |
| Methyl ethyl ketone | 300 parts |
| Cyclohexanone | 100 parts |

The wet coated nonmagnetic support was guided through a magnetic field for orientation, then dried, calendered and slit to a width of ½ inch to give video tape for a VHS system.

The carbon black was desalted with distilled water and the Na and Cl contents were adjusted to the specified levels (Table 5) with NaCl, NaOH and HCl.

The video tape samples obtained were evaluated in the same manner as in Example 6. The results obtained are summarized in Table 5.

TABLE 5

|  | Carbon Black | | Dropouts | Head |
|---|---|---|---|---|
|  | Cl Content (ppm) | Na Content (ppm) | (5 μsec, −16 dB) | Clogging (reels) |
| Example 8 | — | 10 | 25 | 0 |
| Example 9 | 300 | 10 | 30 | 0 |
| Example 10 | 50 | 100 | 27 | 0 |
| Example 11 | 150 | 100 | 35 | 0 |
| Example 12 | 50 | 20 | 30 | 0 |
| Example 13 | 150 | 10 | 26 | 0 |
| Example 14 | 150 | 50 | 28 | 0 |
| Example 15 | 150 | 90 | 28 | 0 |
| Example 16 | 300 | 10 | 35 | 0 |
| Example 17 | 300 | 50 | 36 | 0 |
| Example 18 | 300 | 100 | 36 | 1 |
| Comparative Example 7 | 450 | 150 | 450 | 5 |

As is evident from the data shown in Table 5, the incidence of dropouts was low and that of head clogging during VTR operation was very low in each of Examples 8 to 18 according to the invention. The data in Table 5 thus indicate that to reduce the Na content and Cl of carbon black is very effective in preventing dropout and head clogging.

The following examples (Examples 19 to 24) are concerned with the magnetic recording medium (4) according to the invention.

EXAMPLE 19

A magnetic coating mix was prepared by charging a kneader with the magnetic layer ingredients listed below under [I], kneading the charge to a sufficient extent, adding the ingredients listed under [II], kneading the resulting mixture to a sufficient extent and adding, prior to application, the ingredients listed under [III], followed by kneading for attaining homogeneous dispersion.

| Magnetic Coating Mix Composition | |
|---|---|
| [I] | |
| Ferromagnetic alloy powder (Washed with deionized water to Na content 50 ppm; specific surface area (nitrogen adsorption method) 45 m²/g; powder Hc 1,800 Oe) | 300 parts |
| Vinyl chloride-vinyl acetate resin (Na content below detection limit; COOH-containing; 400 × 110A, product of Nippon Zeon) | 36 parts |
| Polyurethane resin (Crisvon 7209, product of Dainippon Ink and Chemicals) | 10 parts |
| Carbon black (Vulcan XC72 washed with deionized water; Na content 30 ppm; product of Cabot; mean particle size 30 mμ) | 18 parts |
| Abrasive: α-Al₂O₃ (Hit 100, product of Sumitomo Chemical; Na content below detection limit; mean particle size 0.1 μm) | 12 parts |
| Oleic acid | 3 parts |
| Cyclohexanone | 150 parts |
| [II] | |
| Polyurethane resin (Nippolan N2304, product of Nippon Polyurethane Industry) | 26 parts |
| Methyl ethyl ketone | 550 parts |
| Octyl myristate | 3 parts |
| [III] | |
| Polyisocyanate (Coronate L, product of Bayer) | 24 parts |
| Stearic acid | 3 parts |
| Methyl ethyl ketone | 100 parts |

After viscosity adjustment, this magnetic coating mix was applied to a non-magnetic polyethylene terephthalate support to a dry coating thickness of 3.0 μm, and the wet coated support was guided through a magnetic field consisting of a 3,000-gauss magnet, then dried, calendered and slit to a ½ inch width to give video tape for a VHS system.

EXAMPLE 20

Video tape was manufactured in the same manner as in Example 19 except that the ferromagnetic alloy powder in the magnetic layer composition after washing with deionized water had an Na content of 100 ppm.

COMPARATIVE EXAMPLE 8

Video tape was manufactured in the same manner as in Example 19 except that the ferromagnetic alloy powder used in the magnetic layer composition had an Na content of 300 ppm.

The video tapes obtained in the above manner were evaluated for dropouts and head clogging in the same manner as in Example 4.

The results obtained are shown in Table 6.

TABLE 6

|  | Ferromagnetic Alloy Powder | | Dropouts | Head |
|---|---|---|---|---|
|  | Na Content (ppm) | Cl Content (ppm) | (5 μsec, −16 dB) | Clogging (reels) |
| Example 19 | 50 | 80 | 33 | 0 |
| Example 20 | 100 | 170 | 35 | 0 |
| Comparative Example 8 | 300 | 500 | 116 | 5 |

In preparing the ferromagnetic alloy powders used in Examples 19 and 20, goethite was produced while avoiding the use of excess NaOH and washing was made with deionized water prior to reduction to alloy powders so that the Na content could be reduced. In Comparative Example 8, the Na quantity was excessive and washing with deionized water was omitted. In that case, rapid crystal growth is an advantage from the production viewpoint.

As is evident from the data shown in Table 6, the magnetic recording media according to the invention showed superior performance characteristics with respect to dropouts and head clogging. In Comparative Example 8, the high Na content clearly produced adverse effects.

EXAMPLE 21

A magnetic coating mix was prepared by charging a kneader with a portion of the composition specified below, kneading the charge to a sufficient extent, adding the remainder of the composition, kneading the resulting mixture to a sufficient extent, adding 15 parts of Desmodur L-75 (polyisocyanate compound; product of Bayer) and kneading the whole mixture for attaining homogeneous dispersion.

| Magnetic Coating Mix Composition | |
|---|---|
| Fe—Ni alloy (Ni content ca 5% by weight; specific surface area (nitrogen adsorption method) 45 m²/g; powder Hc 1,500 Oe; washed with deionized water to Na content 10 ppm) | 300 parts |
| Vinyl chloride/vinyl acetate resin (VMCH, product of Union Carbide) | 30 parts |
| Crystalline polyurethane resin (C-7209, product of Dainippon Ink and Chemicals) | 30 parts |
| Carbon black (mean particle size 20 mµ) | 6 parts |
| α-Alumina (Hit 100, product of Sumitomo Chemical; mean particle size 0.1 µm) | 24 parts |
| Oleic acid | 3 parts |
| Octyl laurate | 3 parts |
| Lauric acid | 4.2 parts |
| Butyl acetate | 700 parts |
| Methyl ethyl ketone | 300 parts |

After viscosity adjustment, this magnetic coating mix was applied to a 10 µm-thick polyethylene terephthalate support and the wet coated support was subjected to orientation treatment, drying and calendering. A magnetic layer (dry thickness 3.0 µm) was thus formed.

A back coating mix was prepared by milling a mixture composed of the ingredients specified below in a ball mill, adding 15 parts of Coronate 2061 (polyisocyanate; product of Nippon Polyurethane industry), and further milling the mixture to attain homogeneous dispersion. After viscosity adjustment, this back coating mix was applied to the polyester support on the side reverse to the magnetic layer to a thickness of 0.7 µm and then dried.

| Back Coating Composition | |
|---|---|
| Carbon black (Conductex SC, product of Cabot; mean particle size 20 mµ) | 100 parts |
| Polyurethane resin (Estane 5070, product of B. F. Goodrich) | 60 parts |
| Phenoxy resin (PKHH, product of Union Carbide) | 20 parts |
| Nitrocellulose | 20 parts |
| Copper oleate | 0.1 part |
| Methyl ethyl ketone | 600 parts |
| Cyclohexanone | 400 parts |

The tape thus obtained was mirror-finished by calendering and then slit to width of a 1 inch to give sample tapes.

The Fe-Ni alloy used in the above magnetic layer had a reduced Na content of 10 ppm, attained by restricting the excessive Na quantity in goethite manufacture and by washing with deionized water prior to reduction of the alloy powder.

EXAMPLES 22 TO 24

Video tape samples were manufactured in the same manner as in Example 21 except that Fe-Ni alloys each used in the magnetic layer composition had Na contents of 30 ppm, 80 ppm and 200 ppm, respectively, resulting from adjustment of the excessive Na quantity in goethite production and washing with deionized water prior to reduction.

COMPARATIVE EXAMPLES 9 AND 10

Video tape samples were manufactured in the same manner as in Example 21 except that Fe-Ni alloys each used in the magnetic layer composition had Na contents of 300 ppm and 500 ppm, respectively.

In preparing such Fe-Ni alloys, sodium hydroxide was used in large excess and washing with deionized water was omitted. In such case, rapid crystal growth is an advantage from the production viewpoint.

COMPARATIVE EXAMPLE 11

Video tape samples were manufactured in the same manner as in Example 21 except that the same Fe-Ni alloy washed by the method described in JP-A-56-51029 was used.

The samples obtained in the above manner were evaluated by the following methods.

Dropouts (D.O.)

After 60 minutes of running on a Sony model BVH500 VTR at room temperature (23° C., 70% RH), each video tape sample was stored at 40° C. and 80% RH for 1 week and, after return to room temperature, subjected to dropout check (15 µsec, −16 dB), and the frequency of dropouts per minute was calculated.

Head Clogging

Each video sample slit to ½ inch was stored at 40° C. and 80% RH for 1 week and, after return to room temperature, was played on a type VHS VTR under conditions of 5° C. and 30% RH. For each example, 10 reels having a length corresponding to a play time of 60 minutes were each caused to run repeatedly 100 times and the number of reels with an RF output decrease of 6 dB or more as compared with the original signal was reported.

RF Output Drop

Each video sample slit to ½ inch was stored at 40° C. and 80% RH for 1 week and, after restoration of room temperature played on a type VHS VTR under ambient conditions of 5° C. and 30% RH. For each example, the sample tape was played over a length corresponding to a play time of 60 minutes and the RF output drop relative to the original signal was measured.

The results obtained are shown in Table 7.

TABLE 7

| | Fe—Ni Alloy | | | Characteristics | | |
|---|---|---|---|---|---|---|
| | Na Content (ppm) | Cl Content (ppm) | K Content (ppm) | Dropouts (5 µsec, −16 dB) | Head Clogging (reels) | RF Output Reduction (dB) |
| Example 21 | 10 | 5 | 5 | 30 | 0 | −0.2 |
| Example 22 | 30 | 15 | — | 35 | 0 | −0.3 |
| Example 23 | 80 | 40 | — | 41 | 0 | −0.2 |

TABLE 7-continued

| | Fe—Ni Alloy | | | Characteristics | | |
|---|---|---|---|---|---|---|
| | Na Content (ppm) | Cl Content (ppm) | K Content (ppm) | Dropouts (5 μsec, −16 dB) | Head Clogging (reels) | RF Output Reduction (dB) |
| Example 24 | 200 | 100 | 50 | 43 | 2 | −0.3 |
| Comparative Example 9 | 300 | 150 | — | 181 | 6 | −1.3 |
| Comparative Example 10 | 500 | 200 | 400 | 198 | 8 | −1.5 |
| Comparative Example 11 | 300 | 450 | 150 | 355 | 6 | −1.8 |

As is evident from the data shown in Table 7, the magnetic recording media according to the invention showed good performance characteristics with respect to dropout, head clogging and RF output drop. As regards Comparative Examples 9 and 10, it is apparent that the high Na contents, as a common factor, produced adverse effects.

EXAMPLES 25 TO 27 AND COMPARATIVE EXAMPLES 12 TO 15

A magnetic coating mix having the composition shown below was prepared and applied to a 10 μm-thick non-magnetic polyethylene terephthalate support to a dry thickness of 3.0 μm.

| Magnetic Coating Mix Composition | |
|---|---|
| Ferromagnetic alloy powder [Fe—Ni alloy: Ni content ca 5% by weight; Na content 80 ppm; specific surface area (S-BET) 45 m²/g] | 100 parts |
| Vinyl chloride copolymer (OH group 0.5%; epoxy group 3%; SO₃H group 1%; MR110, product of Nippon Zeon) | 12 parts |
| Urethane resin (C-7209, product of Dainippon Ink and Chemicals) | 12 parts |
| Polyisocyanate (Coronate L, product of Nippon Polyurethane Industry) | 8 parts |
| α-Al₂O₃ (Hit 100, product of Sumitomo Chemical; mean particle size 0.1 μm) | 8 parts |
| Carbon black (mean particle size 0.02 μm; Cl, Na and Ca contents as shown in Table 8) | 6 parts |
| Methyl ethyl ketone | 300 parts |

The wet coated support was treated for orientation in a magnetic field, then dried and calendered. A magnetic layer was thus formed on the support.

A back coating mix was prepared by mixing and milling the ingredients shown below in a ball mill, adding 15 parts of Coronate 2061 (polyisocyanate; product of Nippon Polyurethane Industry), and milling further until a homogeneous dispersion was obtained. After viscosity adjustment, the back coating mix was applied to the non-magnetic support on the side reverse to the above-mentioned magnetic layer to a dry thickness of 0.7 μm and then dried to give a back coat layer.

| Back Coating Composition | |
|---|---|
| Carbon black (mean particle size 0.02 μm; Cl, Na and Ca contents as shown in Table 8) | 100 parts |
| Polyurethane resin (Nippolan 2304, product of Nippon Polyurethane Industry | 20 parts |
| Nitrocellulose | 40 parts |
| Polyurethane resin (UR-8600, product of Toyobo; SO₃Na content 1 × 10⁴ eq/g) | 10 parts |
| Copper oleate | 0.1 part |
| Methyl ethyl ketone | 600 parts |
| Cyclohexanone | 400 parts |

This tape was calendered for mirror finishment and then slit to a width of 1 inch. In this manner, the samples shown in Table 8 were produced The thus-obtained video tape samples were evaluated for their performance characteristics by the following methods.

Number of Dropouts (D.O. Number)

Each video tape was stored at 40° C. and 80% RH for 1 week and, after return to room temperature (23° C., 40% RH), was played on a Sony model BVH500 VTR, and the number of dropouts (15 μsec, −16 dB) per minute was calculated.

Head Clogging

Each video tape was stored at 40° C. and 80% RH for 1 week and, after return to room temperature, was played on a VTR under ambient conditions of 5° C. and 40% RH. In each sample, 10 reels each having a length corresponding to a play time of 60 minutes were tested and the number of reels showing an RF output drop by -16 dB due to video head clogging was reported.

RF Output Drop

Each video tape was stored at 40° C. and 80% RH for 1 week and, after return to room temperature (23° C., 40% RH), played on a VTR, and the RF output drop (dB) after twenty 60-minute passes was measured.

The results obtained are shown in Table 8.

TABLE 8

| | Carbon Black | | | | | | Characteristics | | |
|---|---|---|---|---|---|---|---|---|---|
| | Magnetic Layer | | | Back Layer | | | | Head Clogging (reels) | RF Output Fall (dB) |
| | Cl⁻ (ppm) | Na⁺ (ppm) | Ca⁺⁺ (ppm) | Cl⁻ (ppm) | Na⁺ (ppm) | Ca⁺⁺ (ppm) | D.O. | | |
| Example 25 | 20 | 10 | 5 | 20 | 10 | 5 | 5 | 0/10 | 0.3 |
| Example 26 | 150 | 80 | 40 | 150 | 80 | 40 | 8 | 0/10 | 0.5 |

TABLE 8-continued

| | Carbon Black | | | | | | Characteristics | | |
|---|---|---|---|---|---|---|---|---|---|
| | Magnetic Layer | | | Back Layer | | | | Head | RF Output |
| | $Cl^-$ (ppm) | $Na^+$ (ppm) | $Ca^{++}$ (ppm) | $Cl^-$ (ppm) | $Na^+$ (ppm) | $Ca^{++}$ (ppm) | D.O. | Clogging (reels) | Fall (dB) |
| Example 27 | 300 | 160 | 80 | 300 | 160 | 80 | 13 | 0/10 | 0.6 |
| Comparative Example 12 | 500 | 300 | 100 | 500 | 300 | 100 | 392 | 3/10 | 3.5 |
| Comparative Example 13 | 1000< | 900 | 300 | 1000< | 900 | 300 | 366 | 5/10 | 5.5 |
| Comparative Example 14 | 500 | 300 | 100 | 20 | 10 | 5 | 177 | 4/10 | 2.7 |
| Comparative Example 15 | 150 | 80 | 40 | 500 | 300 | 100 | 181 | 2/10 | 1.9 |

EXAMPLES 28 & 29 AND COMPARATIVE EXAMPLES 16 TO 18

A magnetic coating mix was prepared by charging a portion of the composition shown below into a ball mill, milling to a sufficient extent, adding the remainder of the composition to the ball mill, milling further to a sufficient extent, then adding 10 parts of a polyisocyanate (Bayer's Desmodur L-75) and finally milled to attain a homogeneous dispersion.

| Magnetic Coating Mix Composition | |
|---|---|
| [I] | |
| Co-containing $\gamma$-$Fe_2O_3$ powder (specific surface area (nitrogen adsorption method) 30 $m^2$/g; powder Hc 680 Oe) | 100 parts |
| Vinyl chloride-vinyl acetate resin (87:12.9 mole %; $SO_3Na$ 0.06 mole %) | 10 parts |
| Polyurethane resin (N2304, product of Nippon Polyurethane Industry) | 7 parts |
| Carbon black (mean particle size 30 m$\mu$; Cl, Na and Ca contents as shown in Table 9) | 5 parts |
| Lecitin | 1 part |
| Oleic acid | 2 parts |
| Octyl laurate | 2 parts |
| Butyl acetate | 100 parts |
| Methy ethyl ketone | 200 parts |

After viscosity adjustment, this magnetic coating mix was applied to a 20-$\mu$m-thick polyethylene terephthalate base (non-magnetic support) to a dry thickness of 6 $\mu$m, then treated for orientation, and dried.

A back coating mix was prepared by milling, in a ball mill, the composition shown below, then adding 15 parts of a polyisocyanate (Nippon Polyurethane Industry's Coronate 2061) and further milled until a homogeneous dispersion was attained. After viscosity adjustment, this mix was applied to the polyethylene terephthalate base on the side where there was no magnetic layer, to a dry thickness of 2.0 $\mu$m, followed by drying.

| Back Coat Layer Composition | |
|---|---|
| Carbon black (mean particle size 250 m$\mu$; Cl, Na and Ca contents as shown in Table 9) | 100 parts |
| Polycarbonate polyurethane particles ($SO_3Na$ content 2.0 $\times$ $10^{-5}$ eq/g; mean molecular weight 25,000) | 25 parts |
| Vinyl chloride-vinyl acetate copolymer (87:12.9 mole %; $SO_3Na$ 0.06 mole %) | 15 parts |
| Copper oleate | 0.1 part |
| Stearic acid | 0.2 part |
| Methyl ethyl ketone | 1000 parts |

This magnetic tape was calendered to a mirror finish and then slit to a 1 inch width. In this manner, the samples specified in Table 9 were produced.

The thus-obtained video tape samples were evaluated for their performance characteristics by the methods described above in Examples 25.

The results obtained are shown in Table 9.

TABLE 9

| | Carbon Black | | | | | | Characteristics | | |
|---|---|---|---|---|---|---|---|---|---|
| | Magnetic Layer | | | Back Layer | | | | Head | RF Output |
| | $Cl^-$ (ppm) | $Na^+$ (ppm) | $Ca^{++}$ (ppm) | $Cl^-$ (ppm) | $Na^+$ (ppm) | $Ca^{++}$ (ppm) | D.O. | Clogging (reels) | Fall (dB) |
| Example 28 | 100 | 60 | — | 150 | 100 | — | 10 | 0/10 | 0 |
| Example 29 | 300 | 180 | — | 300 | 200 | — | 15 | 0/10 | 0 |
| Comparative Example 16 | 500 | 350 | — | 300 | 200 | — | 860 | 2/10 | 0.3 |
| Comparative Example 17 | 300 | 180 | — | 500 | 360 | — | 630 | 2/10 | 0.5 |
| Comparative Example 18 | 500 | 350 | — | 500 | 360 | — | 950 | 4/10 | 1.7 |

As is evident from the data shown in Table 8 and Table 9, the magnetic recording media according to the invention showed good performance characteristics with respect to dropouts, head clogging and RF output fall. In the comparative examples, the high Cl contents, as a common factor, evidently produced adverse effects.

EXAMPLE 30

A magnetic coating mix was prepared by charging a kneader with the ingredients listed below under [I], kneading the charge to a sufficient extent, adding the ingredients listed under [II] to the kneader, kneading the resulting mixture to a sufficient extent and, prior to application, adding the ingredients listed under III], followed by further kneading until a homogeneous dispersion was achieved.

| Magnetic Coating Mix Composition | |
|---|---|
| [I] | |
| Co-containing $\gamma$-Fe$_2$O$_3$ powder | 300 parts |
| (Na content 10 ppm; specific surface area (nitrogen adsorption method) 40 m$^2$/g; powder Hc 850 Oe) | |
| Vinyl chloride resin | 30 parts |
| (VMCH, product of Union Carbide) | |
| Polyurethane resin | 5 parts |
| (C-7209, product of Dainippon Ink and Chemicals) | |
| Carbon black | 12 parts |
| (mean particle size 20 m$\mu$) | |
| Abrasive: $\alpha$-Al$_2$O$_3$ | 15 parts |
| (Hit 50, product of Sumitomo Chemical; mean particle size 0.2 $\mu$m) | |
| Lecithin | 1 part |
| Oleic acid | 2 parts |
| Cyclohexanone | 150 parts |
| [II] | |
| Polyurethane resin | 10 parts |
| (C-7209, product of Dainippon Ink and Chemicals) | |
| Butyl acetate | 850 parts |
| Butyl stearate | 3 parts |
| [III] | |
| Polyisocyanate | 15 parts |
| (Desmodur L-75, product of Bayer) | |
| Myristic acid | 3 parts |
| Butyl acetate | 100 parts |

After viscosity adjustment, this magnetic coating mix was applied to a non-magnetic polyethylene terephthalate support to a dry coating thickness of 4.0 $\mu$m. The wet coated support was guided through a magnetic field consisting of a 3,000-gauss magnet for orientation, then dried and calendered. A magnetic layer was thus formed. Then, the non-magnetic support having the magnetic layer was provided with a back coat layer having a dry thickness of 1.5 $\nu$m on the reverse side using a back coat mix prepared milling the ingredients listed below under [IV] in a ball mill for dispersion, then adding the ingredients [V] and stirring the whole mixture.

| Back Coat Layer Composition | |
|---|---|
| [IV] | |
| Carbon black A | 80 parts |
| [Thermax; washed with deionized water; specific surface area (nitrogen adsorption method) 8 m$^2$/g; mean particle size 250 m$\mu$; product of Concarb] | |
| Carbon black B | 20 parts |
| [Conductex SC; washed with deionized water; specific surface area (nitrogen adsorption method) 200 m$^2$/g; mean particle size 20 m$\mu$; product of Cabot] | |
| Polycarbonate polyurethane resin | 30 parts |
| (MAU-FJ, product of Dainichiseika Color & Chemicals) | |
| Polyurethane resin | 5 parts |
| (UR 8600, product of Toyobo) | |
| Phenoxy resin | 15 parts |
| (PKHH, product of Union Carbide) | |
| Copper oleate | 0.1 part |
| Methyl ethyl ketone | 700 parts |
| Cyclohexanone | 300 parts |
| [V] | |
| Polyisocyanate | 5 parts |
| (Coronate 2061, product of Nippon Polyurethane Industry) | |
| Lubricant | 0.1 part |
| (Silicone KF69, product of Shin-Etsu Chemical) | |
| Lubricant | 1 part |
| (Stearic acid) | |
| Methyl ethyl ketone | 100 parts |

Video tape was manufactured by slitting the coated support to a 1 inch width.

EXAMPLE 31

Video tape was manufactured in the same manner as in Example 30 except that Conductex SC washed intensively with deionized water to a Cl content of 20 ppm was used instead of carbon black B in the back coat layer composition.

EXAMPLE 32

Video tape was manufactured in the same manner as in Example 30 except that the carbon black used as carbon black A in the back coat layer composition had an Na content of 10 ppm as a result of intensified washing with deionized water and that the carbon black used as carbon black B in this composition had a Cl content of 20 ppm as a result of intensified washing with deionized water.

COMPARATIVE EXAMPLE 19

Video tape was manufactured in the same manner as in Example 30 except that a commercial grade of Conductex SC which had a Cl content of 1,000 ppm was used as carbon black B in the back coat layer composition.

COMPARATIVE EXAMPLE 20

Video tape was manufactured in the same manner as in Example 30 except that the Cl content of carbon black A in the back coat layer was adjusted to 400 ppm.

COMPARATIVE EXAMPLE 21

Video tape was manufactured in the same manner as in Example 30 except that carbon black A used in the back coat layer composition has a Cl content of 400 ppm and that a commercial grade of Conductex SC having a Cl content of 1,000 ppm was used as carbon black B.

The video tapes obtained in the above manner were evaluated for their performance characteristics by the following methods.

Dropouts (D.O.)

The procedure mentioned above with reference to Examples 1 to 3 was followed.

Head Clogging

The procedure mentioned above with reference to Examples 1 to 3 was followed.

C S/N

The video tape sample was stored at 40° C. and 80% RH for 1 week. After return to room temperature, a video signal was recorded and then regenerated on a Sony model BVH500 VTR, and the AM component of C S/N of regenerated output signal was measured using a noise meter. The value obtained with the video tape of Example 30 was taken as a reference and expressed as 0 dB.

The results obtained are shown in Table 10.

TABLE 10

|  | Carbon Black | | | | | | Characteristics | | |
| --- | --- | --- | --- | --- | --- | --- | --- | --- | --- |
|  | Carbon Black A | | | Carbon Black B | | | Dropout | Head | Output |
|  | Cl⁻ (ppm) | Na⁺ (ppm) | Ca⁺⁺ (ppm) | Cl⁻ (ppm) | Na⁺ (ppm) | Ca⁺⁺ (ppm) | (5 μsec, −10 dB) | Clogging (reels) | C S/N (dB) |
| Example 30 | trace | 100 | 50 | 200 | 70 | 30 | 30 | 0 | 0 |
| Example 31 | trace | 100 | 50 | 20 | 10 | 5 | 33 | 0 | 0 |
| Example 32 | trace | 10 | 5 | 20 | 10 | 5 | 25 | 0 | 0 |
| Comparative Example 19 | trace | 100 | 50 | 1000 | 700 | 300 | 1000< | 7 | −0.6 |
| Comparative Example 20 | 400 | 300 | 50 | 200 | 70 | 30 | 1000< | 3 | −0.4 |
| Comparative Example 21 | 400 | 300 | 50 | 1000 | 700 | 300 | 1000< | 7 | −0.8 |

In Examples 30 to 32 (Table 10), carbon blacks were used after washing with deionized water. The carbon blacks used in Comparative Examples 19 to 21 were selected from among commercial grades of carbon black and modifications thereof.

As is evident from the data shown in Table 10, the magnetic recording media according to the invention showed good performance characteristics with respect to dropout, heat clogging and S/N. In Comparative Examples 19 to 21, electron microscopy revealed the presence of cubic NaCl crystals, 0.5 to 5 μm in size, on the coated film. Furthermore, the deposits collected on the occasion of dropouts or head clogging were found to contain NaCl together with the binder and other ingredients. The efficacy of the invention was thus established.

From the data shown in Table 10 for the examples and comparative examples, it is also apparent that restriction of the Cl content of filler carbon black is particularly effective against dropouts, head clogging or S/N decrease.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon at least one magnetic layer containing a ferromagnetic powder dispersed in a binder, wherein (a) the magnetic layer further comprises at least one of (i) carbon black having a sodium content of at most 100 ppm, (ii) carbon black having a chlorine content of less than 400 ppm, and (iii) an abrasive having a Mohs' hardness of at least 8 and a mean particle size of 0.05 to 0.5 μm and a sodium content of at most 100 ppm; (b) the ferromagnetic powder comprises a magnetic metal powder having a sodium content of at most 200 ppm; and/or (c) the magnetic recording medium further comprises a back layer provided on the side of the non-magnetic support opposite to the magnetic layer, containing carbon black having a chlorine content of at most 300 ppm dispersed in a binder.

2. The magnetic recording medium as claimed in claim 1, wherein said magnetic layer comprises carbon black having a sodium content of at most 100 ppm.

3. The magnetic recording medium as claimed in claim 1, wherein said magnetic layer comprises carbon black having a chlorine content of less than 400 ppm.

4. The magnetic recording medium as olaimed in claim 1, wherein said magnetic layer comprises an abrasive having a Mohs' hardness of at least 8, a mean particle size of 0.05 to 0.5 μm and a sodium content of at most 100 ppm.

5. The magnetic recording medium as claimed in claim 1, wherein said ferromagnetic powder comprises a magnetic metal powder having a sodium content of at most 200 ppm.

6. The magnetic recording medium as claimed in claim 1, further comprising a back layer provided on the side of said support opposite to said magnetic layer, said back coat layer comprising carbon black having a chlorine content of at most 300 ppm dispersed in a binder.

7. The magnetic recording medium as claimed in claim 1, wherein said magnetic layer comprises from 0.005 to 20 parts by weight of a fatty acid per 100 parts by weight of said binder.

8. The magnetic recording medium as claimed in claim 1, wherein said carbon black in (a) and (c) has a specific mean particle size of 5 to 1,000 millimicrons, a specific surface area of 1 to 1,500 m²/g, a pH of 3 to 11, an oil absorption of 5 to 2,000 ml/g, an iodine absorption of 1 to 1,000 mg/g an ash content of at most 0.2% by weight and a water content of 0 to 20% by weight.

9. The magnetic recording medium as claimed in claim 2, wherein said carbon black has a sodium content of at most 70 ppm, a potassium content of at most 100 ppm, and a calcium content of at most 100 ppm.

10. The magnetic recording medium as claimed in claim 2, wherein said magnetic layer contains from 0.5 to 10 parts by weight of carbon black per 100 parts by weight of said ferromagnetic powder.

11. The magnetic recording medium as claimed in claim 4, wherein said abrasive has a sodium content of at most 70 ppm, a potassium content of at most 100 ppm, a calcium content of at most 100 ppm and a chlorine content of at most 300 ppm.

12. The magnetic recording medium as claimed in claim 4, wherein said abrasive is selected from $\alpha$-$Al_2O_3$, $Cr_2O_3$ and SiC.

13. The magnetic recording medium as claimed in claim 4, wherein said magnetic layer comprises said abrasive in an amount of from 0.01 to 20 parts by weight per 100 parts by weight of said binder.

14. The magnetic recording medium as claimed in claim 3, wherein said carbon black has a chlorine content of at most 300 ppm.

15. The magnetic recording medium as claimed in claim 14, wherein said carbon black has a chlorine content of at most 150 ppm.

16. The magnetic recording medium as claimed in claim 3, wherein said magnetic layer contains from 0.5 to 10 parts by weight of said carbon black per 100 parts by weight of said ferromagnetic fine powder.

17. The magnetic recording medium as claimed in claim 5, wherein said magnetic metal powder has a sodium content of at most 100 ppm, a potassium content of at most 200 ppm and a calcium content of at most 200 ppm, said metal powder comprises at least one of iron, cobalt and nickel, and has a specific surface area of at least 35 $m^2/g$, and said magnetic layer comprises from 5 to 300 parts by weight of said binder per 100 parts by weight of said metal powder.

18. The magnetic recording medium as claimed in claim 6, wherein said back coat comprises said binder in an amount of from 30 to 200 parts by weight per 100 parts by weight of said carbon black in said back coat, and said binder contained in said back coat layer is a halogen-free resin selected from a urethane resin, an ester resin, a phenoxy resin, an epoxy resin, a polyisocyanate, a cellulose derivative, and a urethane carbonate resin.

19. The magnetic recording medium as claimed in claim 18, wherein each said binder has a sodium content of at most 100 ppm, and said binder in said magnetic layer is a halogen-containing binder.

* * * * *